(12) United States Patent
Satori et al.

(10) Patent No.: US 7,177,092 B2
(45) Date of Patent: Feb. 13, 2007

(54) WIDE-ANGLE, HIGH-ZOOM-RATIO ZOOM LENS

(75) Inventors: Tomoyuki Satori, Kawagoe (JP); Masashi Hankawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 65 days.

(21) Appl. No.: 10/329,965

(22) Filed: Dec. 27, 2002

(65) Prior Publication Data

US 2003/0165020 A1    Sep. 4, 2003

(30) Foreign Application Priority Data

Dec. 28, 2001 (JP) ............................. 2001-399166
Nov. 18, 2002 (JP) ............................. 2002-333530

(51) Int. Cl.
*G02B 15/14* (2006.01)

(52) U.S. Cl. ....................................... 359/683; 359/676

(58) Field of Classification Search ................ 359/676, 359/683–688
See application file for complete search history.

(56) References Cited

U.S. PATENT DOCUMENTS

| | | | |
|---|---|---|---|
| 4,749,266 A * | 6/1988 | Takahashi et al. ........... | 359/683 |
| 4,896,950 A * | 1/1990 | Endo et al. .................. | 359/683 |
| 5,189,557 A * | 2/1993 | Endo ........................... | 359/683 |
| 5,847,882 A | 12/1998 | Nakayama | |
| 6,094,312 A | 7/2000 | Nakayama | |
| 6,124,972 A * | 9/2000 | Hayakawa et al. .......... | 359/557 |
| 6,147,810 A * | 11/2000 | Misaka ........................ | 359/684 |
| 6,404,561 B1 | 6/2002 | Isono et al. | |
| 6,483,648 B1 * | 11/2002 | Yamanashi .................. | 359/683 |
| 6,594,087 B2 * | 7/2003 | Uzawa et al. ............... | 359/685 |
| 6,631,034 B2 * | 10/2003 | Yamanashi .................. | 359/684 |
| 6,788,464 B2 * | 9/2004 | Misaka ........................ | 359/557 |
| 2001/0046383 A1 * | 11/2001 | Hagimori et al. ............. | 396/72 |

FOREIGN PATENT DOCUMENTS

| JP | 190051 | 7/1996 |
|---|---|---|
| JP | 8-5913 | 12/1996 |
| JP | 194590 | 7/2001 |

* cited by examiner

*Primary Examiner*—Ricky Mack
*Assistant Examiner*—William Choi
(74) *Attorney, Agent, or Firm*—Kenyon & Kenyon LLP

(57) ABSTRACT

The invention relates to a four- or five-group zoom lens that ensures wide-angle performance, high zoom ratios and high quality with a more reduced number of lenses than ever before. The zoom lens comprises, in order from its object side, a first lens group G1 having positive power, a second lens group G2 having negative power, a third lens group G3 having positive power, a fourth lens group G4 having negative power and a fifth lens group G5 having positive power. The fourth lens group G4 comprises one lens. For zooming, all the spacings between the respective lens groups vary and the first lens group G1 moves in such a way as to arrive at the object side at the telephoto end position rather than at the wide-angle end position.

49 Claims, 8 Drawing Sheets

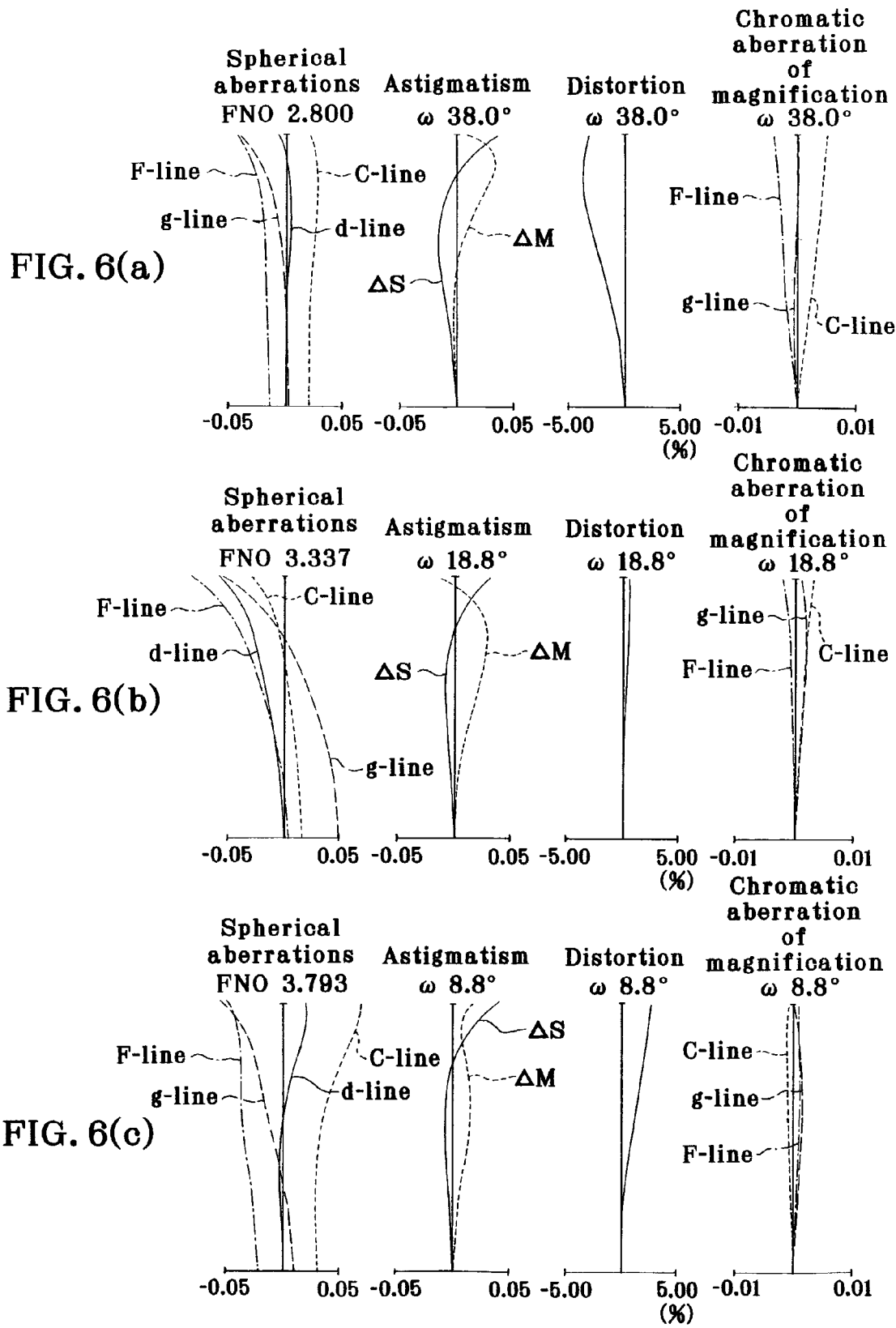

WIDE-ANGLE, HIGH-ZOOM-RATIO ZOOM LENS

This application claims benefit of Japanese Application No. 2001-399166 filed in Japan on Dec. 28, 2001 and No. 2002-333530 filed in Japan on Nov. 18, 2002, the contents of which are incorporated by this reference.

BACKGROUND OF THE INVENTION

The present invention relates generally to a wide-angle, high-zoom-ratio zoom lens, and more specifically to a compact, inexpensive zoom lens for use with image pickup systems or the like, which has a wide-angle arrangement as represented by a diagonal angle of view of 70° or greater at the wide-angle end, a high zoom ratio of 5 to 10 and high image-formation capabilities and comprises a reduced number of lens components.

For instance, patent publication 1 listed below discloses a zoom lens having a zoom ratio of about 20 and an angle of view of 60° or greater at the wide-angle end and comprising a first lens group that remains stationary and has positive power, a second lens group having negative power, a third lens group having positive power, a fourth lens group having negative power and a fifth lens group that remains stationary and has positive power.

Patent publication 2, listed below, discloses a zoom lens having a zoom ratio of about 20 and an angle of view of 60° or greater at the wide-angle end and comprising a first lens group having positive power, a second lens group having negative power, a third lens group having positive power, a fourth lens group having negative power and a fifth lens group having positive power.

Patent publication 3, listed below, discloses a zoom lens comprising a first lens group having positive power, a second lens group having negative power, a third lens group having positive power and a fourth lens group having positive power.

Patent Publication 1

JP-A 08-5913

Patent Publication 2

JP-A 08-190051

Patent Publication 3

JP-A 2001-194590

In the zoom lenses set forth in patent publications 1 and 2, however, the first lens group remains fixed and the front lens has a large diameter; no wide-angle arrangement is achievable while the diameter of the front lens is kept small. Since the second lens group is a unit system, it is difficult to attain aberrational balances between the wide-angle end and the telephoto end. It is also difficult to make correction for aberrations because the second lens group has too strong power.

The zoom lens of patent publication 3 requires a lens component having negative power strong enough to flip up light rays thereby making emergent light telecentric. However, this negative lens component having strong power is located within the third lens group. On the other hand, the third lens group has a zooming function, and so has increased power with an increased amount of movement for zooming. The location of the negative lens component having strong power within the third lens group incurs large fluctuations of astigmatism and coma. To correct the zoom lens for such aberration fluctuations, so many lens components are needed, resulting in increased costs.

SUMMARY OF THE INVENTION

In view of such problems with the prior art as mentioned above, the primary object of the present invention is to provide a four- or five-group zoom lens which can achieve high quality together with wide-angle capability and high zoom capability using a smaller number of lens components than required so far in the art. For this purpose, a negative lens component having strong power is located within an independently movable fourth lens group to flip up light rays, so that aberration fluctuations are minimized.

According to the first embodiment of the invention, this object is achieved by the provision of a wide-angle, high-zoom-ratio zoom lens comprising, in order from an object side thereof, a first lens group having positive power, a second lens group having negative power, a third lens group having positive power, a fourth lens group having negative power and a fifth lens group having positive power, said fourth lens group comprising one lens component, characterized in that:

zooming is carried out by varying all the spacings between said lens groups, and said first lens group moves in such a way as to arrive at the object side of the zoom lens at a telephoto end position rather than at a wide-angle end position.

Advantages of the first wide-angle, high-zoom-ratio zoom lens are now explained.

Such an embodiment ensures that loads on zooming can be allocated to each lens group and the position of the exit pupil can be kept proper. While the diameter of the front lens is kept small, a wide-angle arrangement as represented by an angle of view of 35° or greater is achievable. Moreover, cost reductions, space savings and length reductions are obtainable.

According to the second embodiment of the invention, there is provided a zoom lens as recited in the first embodiment, wherein said third lens group comprises at least one negative lens element and up to two positive lens element and comprises a total of up to three lens elements.

In addition to the advantages of the first wide-angle, high-zoom-ratio zoom lens of the invention, there is an advantage that aberrations produced within the third lens group having a zooming function can be reduced and fluctuations of aberrations with movement of the third lens group can be reduced. Moreover, correction of chromatic aberrations, cost reductions, space savings and length reductions are obtainable.

According to the third embodiment of the invention, there is provided a zoom lens as recited in the first embodiment, wherein said fifth lens group comprises up to two lens elements.

According to the fourth embodiment of the invention, there is provided a wide-angle, high-zoom-ratio zoom lens comprising, in order from an object side thereof, a first lens group having positive power, a second lens group having negative power, a third lens group having positive power, a fourth lens group having negative power and a fifth lens group having positive power, characterized in that:

zooming is carried out by varying all the spacings between said lens groups, said first lens group moves in such a way as to arrive at the object side of said zoom lens at a telephoto end position rather than at a wide-angle end position, and upon zooming from the wide-angle end to the telephoto end the spacing between said fourth lens group and said fifth lens group increases monotonically.

Advantages of the fourth wide-angle, high-zoom-ratio zoom lens are now explained.

Such an embodiment ensures that loads on zooming can be allocated to each lens group and the position of the exit pupil can be kept proper. While the diameter of the front lens is kept small, a wide-angle arrangement as represented by an angle of view of 35° or greater is achievable. Moreover, off-axis ray aberrations can effectively be corrected while the position of the exit pupil is kept proper.

According to the fifth embodiment of the invention, there is provided a wide-angle, high-zoom-ratio zoom lens comprising, in order from an object side thereof, a first lens group having positive power, a second lens group having negative power, a third lens group having positive power and a fourth lens group having positive power in which zooming is carried out by varying all the spacings between said lens groups and said first lens group moves in such a way as to arrive at the object side of said zoom lens at a telephoto end position rather than at a wide-angle end position, characterized in that:

said third lens group is composed of a front subunit and a rear subunit wherein said rear subunit in said third lens group is composed of one lens component and said front subunit and rear subunit in said third lens group move independently during zooming.

Such an embodiment ensures that loads on zooming can be allocated to each lens group and the position of the exit pupil can be kept proper. While the diameter of the front lens is kept small, a wide-angle arrangement as represented by an angle of view of 35° or greater is achievable. Moreover, independently of the front subunit that is a zooming unit, the rear subunit in the third lens group is allowed to have such an action as to make the exit pupil length long.

According to the sixth embodiment of the invention, there is provided a zoom lens as recited in any one of the 1st to 5th embodiments, characterized by satisfying the following condition (1):

$$0.1 < L_{g4}/f_W < 0.45 \quad (1)$$

where $L_{g4}$ is the thickness of the fourth lens group, and $f_W$ is the focal length of the zoom lens at the wide-angle end.

This condition (1) relates to the thickness of the fourth lens group, and as the upper limit of 0.45 thereto is exceeded, the zoom lens becomes too long. As the lower limit of 0.1 is not reached, astigmatism remains undercorrected.

Regarding condition (1), the lower limit value should be limited to preferably 0.13 and more preferably 0.15, and the upper limit value should be limited to preferably 0.4 and more preferably 0.37.

According to the seventh embodiment of the invention, there is provided a zoom lens as recited in any one of the 1st to 4th embodiments, characterized by satisfying the following conditions (2) and (3):

$$0.8 < RH_{5W}/RH_{4W} < 3.0 \quad (2)$$

$$1.0 < RH_{5T}/RH_{4T} < 3.5 \quad (3)$$

where $RH_{4W}$ is the height of the farthest off-axis chief ray at the wide-angle end upon leaving the rearmost surface in the fourth lens group, $RH_{5W}$ is the height of the farthest off-axis chief ray at the wide-angle end upon incidence on the forefront surface in the fifth lens group, $RH_{4T}$ is the height of the farthest off-axis chief ray at the telephoto end upon leaving the rearmost surface in the fourth lens group, and $RH_{5T}$ is the height of the farthest off-axis chief ray at the telephoto end upon incidence on the forefront surface in the fifth lens group.

Advantages of the seventh wide-angle, high-zoom-ratio zoom lens are now explained.

Conditions (2) and (3) define the ratio between the height of a light ray leaving the rearmost surface in the fourth lens group and the height of a light ray incident on the forefront surface in the fifth lens group, and are provided to flip up light rays at the fourth lens group thereby making the exit pupil length long. As the upper limits of 3.0 and 3.5 to the respective conditions are exceeded, the height of the light ray becomes too high, resulting in an increase in the diameter of the lens located before the image plane. As the lower limits of 0.8 and 1.0 to the respective conditions are not reached, the exit pupil length becomes short, resulting in shading at the periphery of the screen.

Regarding condition (2), the lower limit value thereof should be limited to preferably 1.0 and more preferably 1.2, and the upper limit value should be limited to preferably 2.0 and more preferably 1.9.

Regarding condition (3), the lower limit value thereof should be limited to preferably 1.5 and more preferably 1.9, and the upper limit value should be limited to preferably 3.0 and more preferably 2.6.

According to the eighth embodiment of the invention, there is provided a zoom lens as recited in any one of the 1st to 4th embodiments, characterized by satisfying the following conditions (4) and (5):

$$0.3 < D_{45W}/f_W < 0.8 \quad (4)$$

$$0.17 < D_{45T}/f_T < 0.5 \quad (5)$$

where $D_{45W}$ is the spacing between the fourth lens group and the fifth lens group at the wide-angle end, $D_{45T}$ is the spacing between the fourth lens group and the fifth lens group at the telephoto end, $f_W$ is the focal length of the zoom lens at the wide-angle end, and $f_T$ is the focal length of the zoom lens at the telephoto end.

Conditions (4) and (5) relate to the spacing between the fourth lens group and the fifth lens group, and are provided to split a light beam at the front surface in the fifth lens group correspondingly to each image height, so that off-axis aberrations (coma, etc.) can easily be corrected independently for each image height. By complying with these conditions it is also possible to make the exit pupil length long. As the upper limits of 0.8 and 0.5 to the respective conditions are exceeded, the length of the zoom lens becomes too long. As the lower limits of 0.3 and 0.17 to the respective conditions are not reached, an off-axis light beam is not split; it is difficult to make independent correction for off-axis ray aberrations for each image height. The exit pupil length becomes short as well.

Regarding condition (4), the lower limit value thereof should be limited to preferably 0.305 and more preferably 0.309, and the upper limit value should be limited to preferably 0.6 and more preferably 0.45.

Regarding condition (5), the lower limit value thereof should be limited to preferably 0.175 and more preferably 0.177, and the upper limit value should be limited to preferably 0.3 and more preferably 0.2.

According to the ninth embodiment of the invention, there is provided a zoom lens as recited in any one of the 1st to 5th embodiments, characterized by satisfying the following condition (6):

$$9.0 < f_1/f_W < 20.0 \quad (6)$$

where $f_1$ is the focal length of the first lens group, and $f_W$ is the focal length of the zoom lens at the wide-angle end.

Advantages of the ninth wide-angle, high-zoom-ratio zoom lens are now explained.

This condition (6) relates to the power of the first lens group, and as the upper limit of 20.0 thereto is exceeded, the amount of movement of the first lens group becomes large, and so the length of the zoom lens at the telephoto end becomes long and the diameter of the front lens becomes large. As the lower limit of 9.0 is not reached, spherical aberrations remain under-corrected at the telephoto end.

Regarding condition (6), the lower limit value thereof should be limited to preferably 10 and more preferably 11, and the upper limit value should be limited to preferably 18 and more preferably 16.

According to the tenth embodiment of the invention, there is provided a zoom lens as recited in any one of the 1st to 5th embodiments, characterized by satisfying the following condition (7):

$$-1.7 < f_2/f_W < -1.4 \quad (7)$$

where $f_2$ is the focal length of the second lens group, and $f_W$ is the focal length of the zoom lens at the wide-angle end.

Advantages of the 10th wide-angle, high-zoom-ratio zoom lens are now explained.

This condition (7) relates to the power of the second lens group, and as the upper limit of −1.4 thereto is exceeded, the amount of movement of the second lens group becomes large with increases in the diameter of the front lens and the size of the zoom lens. When the lower limit of −1.7 is not reached, the Petzval sum becomes negative and large, resulting in over-correction of the image plane.

Regarding condition (7), the lower limit value thereof should be limited to preferably −1.65 and more preferably −1.61, and the upper limit value should be limited to preferably −1.5 and more preferably −1.55.

According to the 11th embodiment of the invention, there is provided a zoom lens as recited in any one of the 1st to 5th embodiments, characterized by satisfying the following condition (8):

$$1.0 < f_3/f_W < 4.0 \quad (8)$$

where $f_3$ is the focal length of the third lens group, and $f_W$ is the focal length of the zoom lens at the wide-angle end.

Advantages of the 11th wide-angle, high-zoom-ratio zoom lens are now explained.

This condition (8) relates to the power of the third lens group, and as the upper limit of 4.0 thereto is exceeded, the amount of movement of the third lens group becomes large with an increase in the size of the lens system. As the lower limit of 1.0 is not reached, fluctuations of spherical aberrations, astigmatism and other aberrations become noticeable.

Regarding condition (8), the lower limit value thereof should be limited to preferably 1.2 and more preferably 1.3, and the upper limit value should be limited to preferably 3.5 and more preferably 2.6.

According to the 12th embodiment of the invention, there is provided a zoom lens as recited in any one of the 1st to 4th embodiments, characterized by satisfying the following condition (9):

$$-5.5 < f_4/f_W < -0.5 \quad (9)$$

where $f_4$ is the focal length of the fourth lens group, and $f_W$ is the focal length of the zoom lens at the wide-angle end.

Advantages of the 12th wide-angle, high-zoom-ratio zoom lens are now explained.

This condition (9) relates to the power of the fourth lens group, and as the upper limit of −0.5 thereto is exceeded, the diameter of the front lens increases because of an increase in the angle of off-axis light rays between the second lens group and the third lens group. As the lower limit of −5.5 is not reached, there is excessive sensitivity to fabrication errors, and there are large fluctuations of aberrations with movement as well.

Regarding condition (9), the lower limit value thereof should be limited to preferably −5.3 and more preferably −5.2, and the upper limit value should be limited to preferably −0.8 and more preferably −1.0.

According to the 13th embodiment of the invention, there is provided a zoom lens as recited in any one of the 1st to 4th embodiments, characterized by satisfying the following condition (10):

$$1.0 < f_5/f_W < 6.0 \quad (10)$$

where $f_5$ is the focal length of the fifth lens group, and $f_W$ is the focal length of the zoom lens at the wide-angle end.

Advantages of the 13th wide-angle, high-zoom-ratio zoom lens are now explained.

This condition (10) relates to the power of the fifth lens group, and as the upper limit of 6.0 thereto is exceeded, the back focus becomes too long, ending up with an increase in the size of the lens system. As the lower limit of 1.0 is not reached, aberrations are largely out of balance upon focusing of the fifth lens group.

Regarding condition (10), the lower limit value thereof should be limited to preferably 1.5 and more preferably 2.0, and the upper limit value should be limited to preferably 5.0 and more preferably 4.0.

According to the 14th embodiment of the invention, there is provided a zoom lens as recited in any one of the 1st to 5th embodiments, characterized in that:

at least one positive lens element in the first lens group complies with the following conditions (11) and (12):

$$N_{d11} < 1.53 \quad (11)$$

$$\nu_{d11} > 68 \quad (12)$$

where $N_{d11}$ is the d-line refractive index of at least one positive lens element in the first lens group, and $\nu_{d11}$ is the d-line Abbe number of at least one positive lens element in the first lens group.

Advantages of the 14th wide-angle, high-zoom-ratio zoom lens are now explained.

Conditions (11) and (12) relate to a vitreous material for the first lens group, and is provided to make proper correction for chromatic aberrations produced at the first lens group.

Regarding condition (11), the upper limit value thereof should be limited to preferably 1.5 and more preferably 1.49. The lower limit to condition (11) should preferably be equal to or greater than 1.46, because lens materials having a value of less than 1.46 cost much.

Regarding condition (12), the lower limit value thereof should be limited to preferably 69 and more preferably 70. The upper limit to condition (12) should preferably be equal to or less than 82 because lens materials having a value of greater than 82 cost much.

According to the 15th embodiment of the invention, there is provided a zoom lens as recited in any one of the 1st to 5th embodiments, characterized in that:

the second lens group is composed of a first subunit and a second subunit wherein the first subunit comprises a negative meniscus lens element concave on its image plane side, and the second subunit comprises a doublet component consisting of, in order from its object side, a negative lens element and a positive lens element, said doublet having a cemented surface convex on its object side.

Advantages of the 15th wide-angle, high-zoom-ratio zoom lens are now explained.

By allowing the first subunit to comprise a negative meniscus lens element concave on its image plane, the angles of an axial light beam and an off-axis light beam emerging from the first subunit can be made so small that correction of aberrations (such as coma, chromatic aberration of magnification and distortion) at the second subunit and the following lens groups can be facilitated. By allowing the second subunit to comprise a doublet, it is possible to make correction for chromatic aberrations produced within the second lens group and reduce fluctuations of chromatic aberrations with zooming movement. By permitting the doublet to be of −+ construction, it is possible to reduce higher-order off-axis chromatic aberrations of magnification at the wide-angle end. By permitting the cemented surface of the double to be convex on its object side, it is possible to reduce higher-order off-axis chromatic aberrations of magnification at the wide-angle end.

According to the 16th embodiment of the invention, there is provided a zoom lens as recited in any one of the 1st to 5th embodiments, characterized in that:

a negative lens element in the third lens group is cemented to other lens element.

Referring advantages of the 16th wide-angle, high-zoom-ratio zoom lens, longitudinal chromatic aberration can be corrected because the negative lens element in the third lens group is cemented to other lens element.

According to the 17th embodiment of the invention, there is provided a zoom lens as recited in any one of the 1st to 5th embodiments, characterized in that:

an aspheric surface is located nearest to the object side of the third lens group.

Advantages of the 17th wide-angle, high-zoom-ratio zoom lens, spherical aberrations can effectively be corrected by the aspheric surface located nearest to the object side of the third lens group.

According to the 18th embodiment of the invention, there is provided a zoom lens as recited in any one of the 1st to 5th embodiments, characterized in that:

at least one positive lens element in the third lens group complies with the following conditions (13) and (14):

$$N_{d31} < 1.53 \quad (13)$$

$$v_{d31} > 78 \quad (14)$$

where $N_{d31}$ is the d-line refractive index of at least one positive lens element in the third lens group, and $v_{d31}$ is the d-line Abbe number of at least one positive lens element in the third lens group.

Advantages of the 18th wide-angle, high-zoom-ratio zoom lens are that by using for at least one positive lens element in the third lens group a special low-dispersion glass, i.e., a glass that complies with conditions (13) and (14), it is possible to make effective correction for longitudinal chromatic aberration.

Regarding condition (13), the upper limit value thereof should be limited to preferably 1.51 and more preferably 1.50. The lower limit to condition (13) should preferably be equal to or greater than 1.46, because lens materials having a value of less than 1.46 cost much.

Regarding condition (14), the lower limit value thereof should be limited to preferably 69 and more preferably 70.

The upper limit to condition (14) should preferably be equal to or less than 85 or 82 because lens materials having a value of greater than 85 cost much.

According to the 19th embodiment of the invention, there is provided a zoom lens as recited in any one of 1st to 3rd embodiments, characterized in that:

one lens element forming the fourth lens group is a single lens element and satisfies the following condition (15):

$$0.5 < SF_{4g} \quad (15)$$

where $SF_{4g} = (R_f + R_b)/(R_f - R_b)$ wherein $R_f$ is the axial radius of curvature of the front surface of the lens component forming the fourth lens group, and $R_b$ is the axial radius of curvature of the rear surface of the lens component forming the fourth lens group.

Advantages of the 19th wide-angle, high-zoom-ratio zoom lens are now explained. This condition (15) relates to the configuration of a single lens component used to form the fourth lens component. As the lower limit of 0.5 is not reached, the Petzval sum becomes worse.

Regarding condition (15), the lower limit value thereof should be limited to preferably 0.55 and more preferably 0.608. The upper limit value should preferably be equal to or less than 5.0 or 2.5. At greater than the upper limit, it is difficult to process that lens while the necessary refracting power is ensured.

According to the 20th embodiment of the invention, there is provided a zoom lens as recited in any one of the 1st to 4th embodiments, characterized in that:

the fifth lens group comprises a doublet consisting of a positive lens element and a negative lens element.

Advantages of the 20th wide-angle, high-zoom-ratio zoom lens are now explained. By allowing the fifth lens group to comprise a doublet consisting of a positive lens element and a negative lens element, it is possible to reduce fluctuations of chromatic aberrations with zooming movement.

According to the 21st embodiment of the invention, there is provided a zoom lens as recited in any one of the 1st to 4th embodiments, characterized in that:

the fifth lens group has therein an aspheric surface.

Advantages of the 21st wide-angle, high-zoom-ratio zoom lens are now explained. By providing an aspheric surface in the fifth lens group, it is possible to make satisfactory correction for astigmatism.

According to the 22nd embodiment of the invention, there is provided a zoom lens as recited in any one of the 1st to 5th embodiments, characterized by satisfying the following condition (16):

$$0.4 < \Delta\beta_3/\Delta\beta_2 < 2.0 \quad (16)$$

where $\Delta\beta_2$ is the zoom ratio of the second lens group, and $\Delta\beta_3$ is the zoom ratio of the third lens group.

Advantages of the 22nd wide-angle, high-zoom-ratio zoom lens are now explained.

Condition (16) relates to the proportion in zoom ratio between the second lens group and the third lens group, and is provided to properly allocate loads on zooming to the second and the third lens group. As the upper limit of 2.0 to this condition is exceeded, the load of the third lens group on zooming becomes too large, making it difficult to correct aberrations (such as spherical aberrations and astigmatism), and as the lower limit of 0.4 is not reached, the load of the second lens group on zooming becomes too large, making it difficult to correct aberrations (such as distortion and chromatic aberration of magnification at the wide-angle end).

Regarding condition (16), the lower limit value thereof should be limited to preferably 0.5 and more preferable 0.54, and the upper limit value should be limited to preferably 1.7 and more preferably 1.5.

According to the 23rd embodiment of the invention, there is provided a zoom lens as recited in any one of the 1st to 5th embodiments, characterized by satisfying the following condition (17):

$$10.0 < L_W/IH < 20.0 \quad (17)$$

where $L_W$ is the length of the zoom lens at the wide angle, and IH is the maximum image height.

Referring here to an image pickup system comprising an electronic image pickup device located on the image plane side of a zoom lens, the maximum image height IH is half the diagonal length of an effective image pickup area of the electronic image pickup device. This effective image pickup area defines a range in which an image can be reconstructed on the image pickup plane of the electronic image pickup device. When this range is arbitrarily variable, the maximum image height IH is defined as the maximum height in the widest possible range.

Advantages of the 23rd wide-angle, high-zoom-ratio zoom lens are now explained.

Condition (17) relates to the total length of the zoom lens, and as the upper limit of 20.0 thereto is exceeded, the total length becomes long, contrary to compactness. As the lower limit of 10.0 is not reached, the power of each lens group becomes too strong, making it impossible to correct aberrations such as coma and astigmatism.

Regarding condition (17), the lower limit value thereof should be limited to preferably 12 and more preferably 14, and the upper limit value should be limited to preferably 19 and more preferably 18.

According to the 24th embodiment of the invention, there is provided a zoom lens as recited in any one of the 1st to the 4th embodiments, characterized by satisfying the following condition (18):

$$0.05 < d_{45W}/f_5 < 0.25 \quad (18)$$

where $d_{45W}$ is the spacing between the fourth lens group and the fifth lens group at the wide-angle end, and $f_5$ is the focal length of the fifth lens group.

Advantages of the 24th wide-angle, high-zoom-ratio zoom lens are now explained.

This condition (18) relates to the variable spacing range upon focusing by the fifth lens group. As the upper limit of 0.25 is exceeded, the total length of the zoom lens becomes long, contrary to compactness, and as the lower limit of 0.05 is not reached, there is no ample space for focusing.

Regarding condition (18), the lower limit value thereof should be limited to preferably 0.06 and more preferably 0.069, and the upper limit value should be limited to preferably 0.23 and more preferably 0.20.

According to the 25th embodiment of the invention, there is provided a zoom lens as recited in any one of the 1st to 5th embodiments, characterized by further comprising a stop that is movable together with the third lens group.

Advantages of the 25th wide-angle, high-zoom-ratio zoom lens are now explained. When the stop moves together with the third lens group, correction of aberrations (such as coma and astigmatism) is easily achievable because the positions of light rays passing through the third and following lens groups become low.

According to the 26th embodiment of the invention, there is provided a zoom lens as recited in any one of the 1st to 5th embodiments, characterized in that:

the first lens group is composed of two lens elements or a negative lens element convex on its object side and a positive lens element convex on its object side.

Advantages of the 26th wide-angle, high-zoom-ratio zoom lens are that with a limited number of lens elements, it is possible to make proper correction for aberrations (such as longitudinal chromatic aberration and chromatic aberration of magnification) at the first lens group.

According to the 27th embodiment of the invention, there is provided a zoom lens as recited in any one of the 1st to 5th embodiments, characterized by further comprising a stop and satisfying the following conditions (19) to (22):

$$N_{dFS} < 1.53 \quad (19)$$

$$v_{dFS} > 78 \quad (20)$$

$$N_{dRS} < 1.53 \quad (21)$$

$$v_{dRS} > 78 \quad (22)$$

where $N_{dFS}$ is the d-line refractive index of at least one lens element located in front of the stop, $v_{dFS}$ is the d-line Abbe number of at least one lens element located in front of the stop, $N_{dRS}$ is the d-line refractive index of at least one lens element located in the rear of the stop, and $v_{dRS}$ is the d-line Abbe number of at least one lens element located in the rear of the stop.

Advantages of the 27th wide-angle, high-zoom-ratio zoom lens are now explained.

Conditions (19) to (22) are set to use special low-dispersion glasses for the lens groups located before and after the stop; the glass that satisfies conditions (19) and (20) and the glass that satisfies conditions (21) and (22) should be used. With the special low-dispersion glass used for the lens groups located before the stop, it is possible to make correction for chromatic aberration of magnification, and with that used for the lens groups located after the stop, it is possible to make effective correction for longitudinal chromatic aberration.

Regarding conditions (19) and (21), the upper limit values thereof should be limited to preferably 1.51 and more preferably 1.50. Although not critical, it is preferable to set the lower limit value at 1.46 or greater, because lens materials having a value of less than 1.46 cost much.

Regarding conditions (20) and (22), the lower limit values thereof should be limited to preferably 80 and more preferably 81. Although not critical, it is preferable to set the upper limit values at 85 or less or 82 or less because lens materials having a value of greater than 85 cost much.

According to the 28th embodiment of the invention, there is provided a zoom lens as recited in any one of the 1st to 5th embodiments, characterized in that:

the second lens group is composed of, in order from its object side, a negative lens element, a negative lens element, a negative lens element and a positive lens element or four lens elements in all.

Advantages of the 28th wide-angle, high-zoom-ratio zoom lens are that it is possible to prevent off-axis light rays from producing higher-order aberrations (such as chromatic aberration of magnification, distortion and coma).

According to the 29th embodiment of the invention, there is provided a zoom lens as recited in the 28th embodiment, characterized in that:

the first and second lens elements in the second lens group, as viewed from its object side, are each a negative meniscus lens concave on its image plane side.

Advantages of the 29th wide-angle, high-zoom-ratio zoom lens are that the large negative power necessary for the second lens group is allocated to the two lens elements, thereby preventing the occurrence of excessive astigmatism and coma.

According to the 30th embodiment of the invention, there is provided a zoom lens as recited in any one of the 28th or 29th embodiment, characterized by satisfying the following condition (23):

$$1.0 \leq SF_{22} \tag{23}$$

where $SF_{22}=(R_f+R_b)/(R_f-F_b)$ wherein $R_f$ is the axial radius of curvature of the front surface of the second lens element in the first lens group as viewed from its object side, and $R_b$ is the axial radius of curvature of the rear surface of the second lens in the second lens group as viewed from its object side.

Advantages of the 30th wide-angle, high-zoom-ratio zoom lens are now explained. This condition (23) relates to the configuration of the second negative lens element in the second lens group as viewed from its object side, and is provided to prevent the occurrence of excessive distortion and chromatic aberration of magnification at the wide-angle end.

Regarding condition (23), the lower limit value thereof should be limited to preferably 1.5 and more preferably 1.7. Although not critical, it is preferable to set the upper limit value at 5.0 or less or 2.5 or less, because at greater than that upper limit, it is difficult to process that negative lens element while the necessary refracting power is ensured.

According to the 31st embodiment of the invention, there is provided a zoom lens as recited in any one of the 1st to 5th embodiments, characterized in that:

said second lens group comprises a doublet component having a cemented surface and satisfies the following condition (24):

$$-2.0 < R_{2ce}/f_2 < -0.5 \tag{24}$$

where $R_{2ce}$ is the axial radius of curvature of the cemented surface in the second lens group, and $f_2$ is the focal length of the second lens group.

Advantages of the 31st wide-angle, high-zoom-ratio zoom lens are now explained. This condition (24) relates to the power of the doublet component in the second lens group, and as the upper limit of −0.5 thereto is exceeded, chromatic aberrations produced within the second lens group remain under-corrected. As the lower limit of −2.0 is not reached, higher-order chromatic aberrations are produced at the wide-angle end.

Regarding condition (24), the upper limit value thereof should be limited to preferably −1.8 and more preferably −1.7, and the upper limit value should be limited to preferably −0.7 and more preferably −0.9.

According to the 32nd embodiment of the invention, there is provided a zoom lens as recited in any one of the 1st to 5th embodiments, characterized in that:

the second lens group has therein an aspheric surface.

Advantages of the 32nd wide-angle, high-zoom-ratio zoom are that by providing an aspheric surface in the second lens group, it is possible to make correction for distortion at the wide-angle end.

According to the 33rd embodiment of the invention, there is provided a zoom lens as recited in any one of the 1st to 5th embodiments, characterized by satisfying the following condition (25):

$$1.4 < R_{1b}/R_{2f} < 3.0 \tag{25}$$

where $R_{1b}$ is the axial radius of curvature of the final surface in the first lens group, and $R_{2f}$ is the axial radius of curvature of the forefront surface in the second lens group.

Advantages of the 33rd wide-angle, high-zoom-ratio zoom lens are now explained. This condition (25) gives a definition of the radius-of-curvature ratio between the final surface in the first lens group and the forefront surface in the second lens group. As the upper limit of 3.0 is exceeded, there is an increase in the angle of an off-axis light beam that is entered into the second lens group upon leaving the first lens group, resulting in an increase in the diameter of the front lens, and as the lower limit is not reached, negative distortion at the wide-angle end remains under-corrected.

Regarding condition (25), the lower limit value thereof should be limited to preferably 1.6 and more preferably 1.8, and the upper limit value should be limited to preferably 2.5 and more preferably 2.0.

According to the 34th embodiment of the invention, there is provided a zoom lens as recited in any one of the 1st to 33rd embodiments, characterized by satisfying the following condition (26):

$$4 < Z < 15 \tag{26}$$

where Z is the zoom ratio of the zoom lens.

Advantages of the 34th wide-angle, high-zoom-ratio zoom lens are now explained. The wide-angle, high-zoom-ratio zoom of the present invention should preferably have a zoom ratio of 4 to 15 in view of the balance between performance and size. At a zoom ratio of less than the lower limit of 4 to condition (26), it is unnecessary to adopt an arrangement comprising 4 or more lens groups; however, at a zoom ratio of greater than the upper limit of 15, the total length of the zoom lens becomes long.

Regarding condition (26), the lower limit value thereof should be limited to preferably 4.5 and more preferably 4.7, and the upper limit value should be limited to preferably 12.0 and more preferably 10.0 in consideration of further improvements in the balance between performance and size.

According to the 35th embodiment of the invention, there is provided a zoom lens as recited in any one of the 1st to 34th embodiments, characterized by satisfying the following condition (27):

$$30° < \omega_W < 47° \tag{27}$$

where $\omega_W$ is the half angle of view at the wide-angle end.

Advantages of the 35th wide-angle, high-zoom-ratio zoom lens are now explained. As the upper limit of 47° is exceeded, distortion is likely to occur. As the lower limit of 30° is not reached, any perspective peculiar to wide-angle shots is hardly obtainable because of narrow object ranges.

Regarding condition (27), the lower limit value thereof should be limited to preferably 33° and more preferably 36°. In consideration of further improvements in the balance between wide-angle performance and aberration performance, the upper limit value should be limited to preferably 42° and more preferably 39°.

It is here understood that the present invention encompasses an image pickup system comprising any one of the 1st to 35th wide-angle, high-zoom-ratio zoom lenses and an electronic image pickup device located on its image side.

It is also appreciated that even when at least two of conditions (1) to (27) are simultaneously satisfied, it is possible to attain the object of the invention, and so they may be used in any desired combination of two or more.

Still other objects and advantages of the invention will in part be obvious and will in part be apparent form the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIGS. 6(a), 6(b) and 6(c) are aberration diagrams for Example 2 at the wide-angle end (a), in the intermediate settings (b) and the telephoto end (c) upon focused at infinity.

FIG. 7 is a front perspective schematic illustrative of the outside appearance of a digital camera with the inventive zoom lens built in.

DESCRIPTION OF THE PREFERRED EMBODIMENTS

Figure 1:
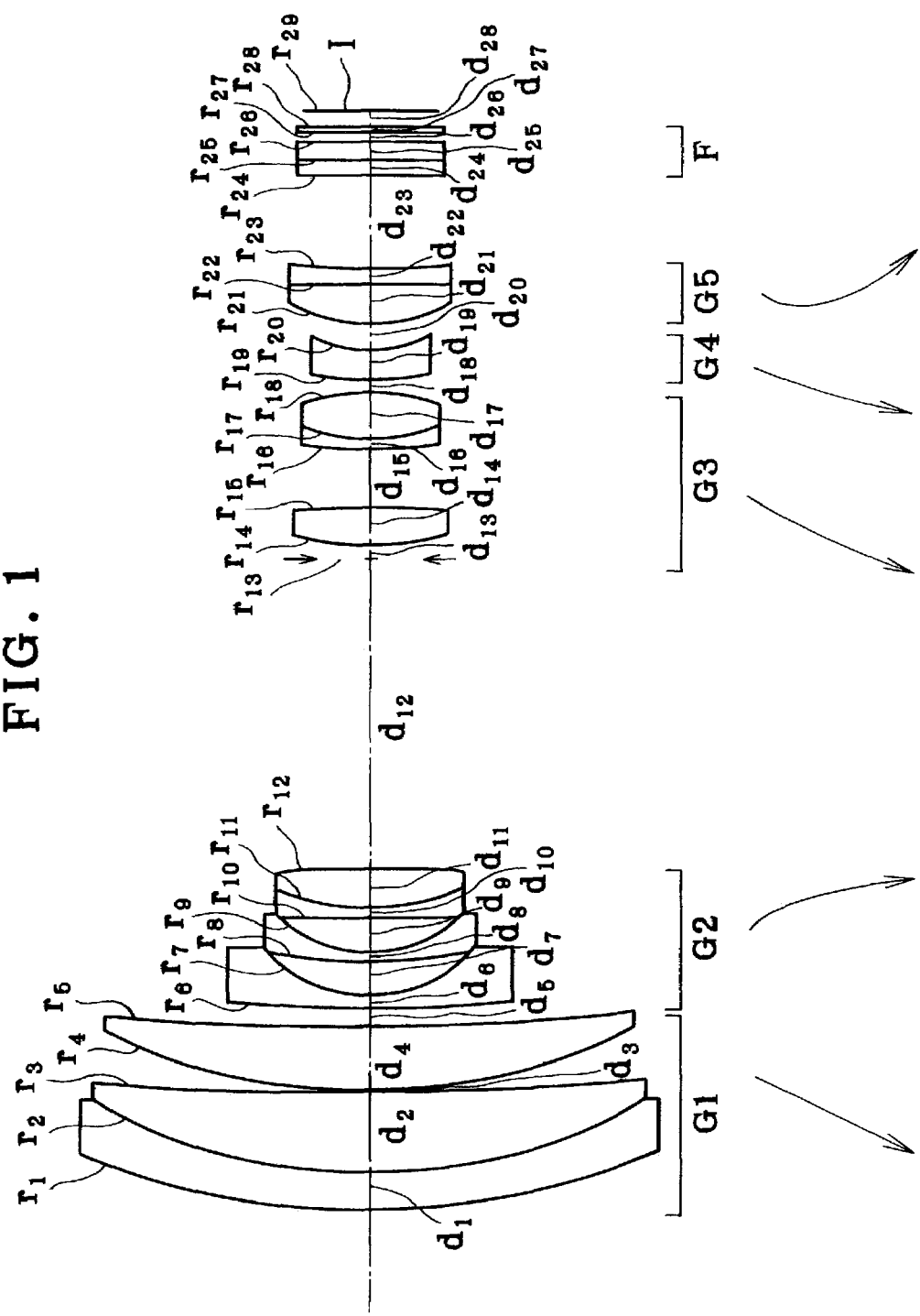
FIG. 1 is illustrative in section of the lens arrangement of Example 1 of the wide-angle, high-zoom-ratio zoom lens of the invention at the wide-angle end upon focused on an object point at infinity.
Figure 2:
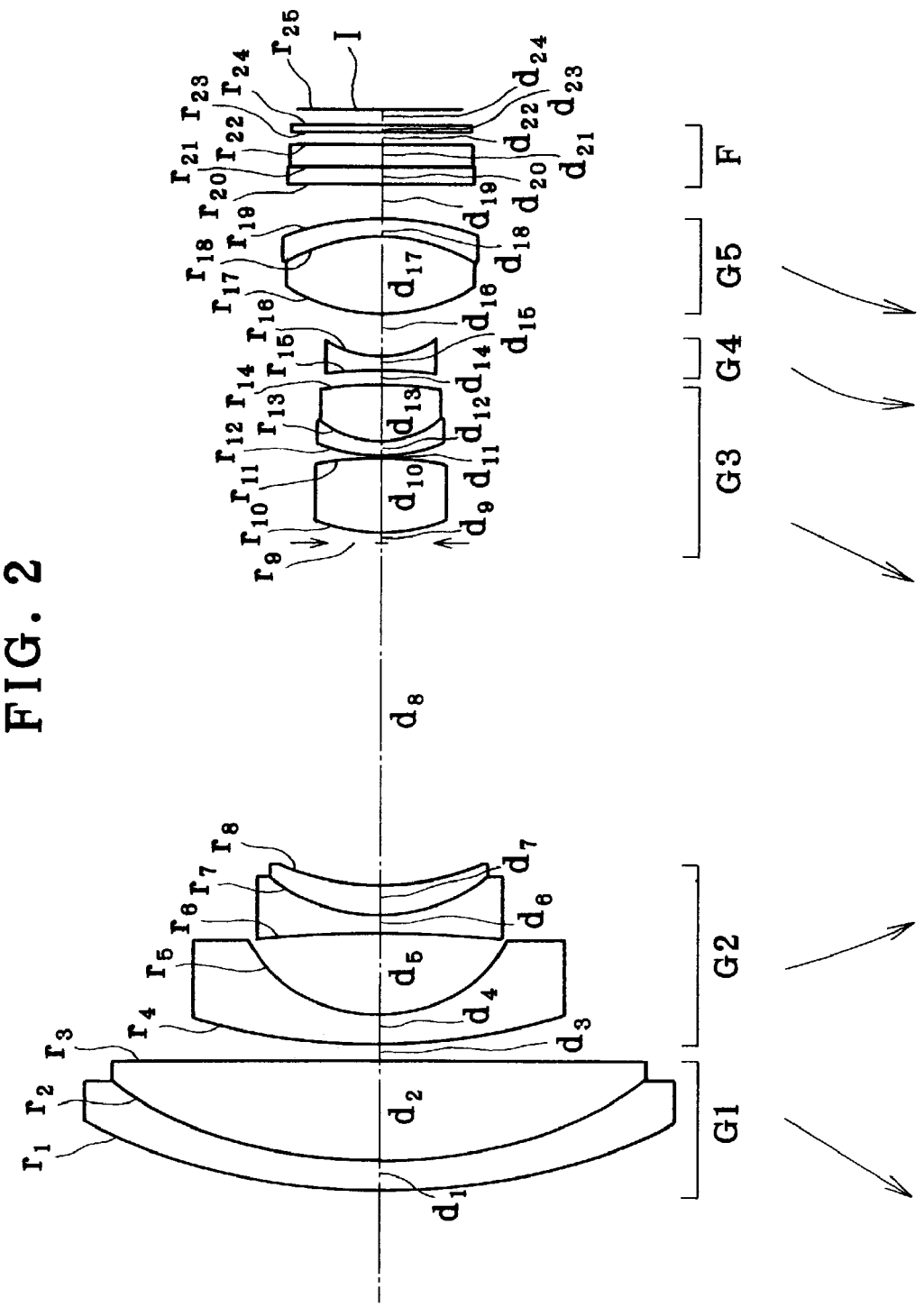
FIG. 2 is illustrative in section of the lens arrangement of Example 2 of the wide-angle, high-zoom-ratio zoom lens of the invention at the wide-angle end upon focused on an object point at infinity.

The wide-angle, high-zoom-ratio zoom lens of the invention is now explained more specifically with reference to Examples 1 to 4. FIGS. 1 and 2 are illustrative in section of the lens arrangements of Examples 1 and 2 at the wide-angle end upon focused on an object point at infinity, with arrows indicative of the locus of each lens group arriving at the telephoto end via the intermediate state.

In FIGS. 1 to 2, G1 represents the first lens group, G2 the second lens group, G3 the third lens group, G4 the fourth lens group, G5 the fifth lens group, F a parallel-plane plate group comprising an optical low-pass filter, a cover glass for a CCD that is an electronic image pickup device, etc., and I an image plane of the CCD. The parallel-plane plate group F is fixedly located between the fifth lens group G5 and the image plane I. S represents an independently movable stop.

EXAMPLE 1

The zoom lens of this example is made up of a first lens group G1 having positive refracting power, a second lens group G2 having negative refracting power, a third lens group G3 having positive refracting power, a fourth lens group G4 having negative refracting power and a fifth lens group G5 having positive refracting power, as shown in FIG. 1. Upon zooming from the wide-angle end to the telephoto end of the zoom lens while focused on an object point at infinity, the first lens group G1 moves toward the object side of the zoom lens and upon arriving at the telephoto end it is positioned nearer to the object side than at the wide-angle end, the second lens group G2 moves toward the image plane side of the zoom lens and upon arriving at the telephoto end it is located at much the same position as in the intermediate setting, the third lens group G3 moves toward the object side, the fourth lens group G4 moves toward the object side while the spacing between it and the third lens group G3 becomes wide, and the fifth lens group G5 moves toward the object side in a convex locus and upon arriving at the telephoto end it is positioned nearer to the image plane side than at the wide-angle end.

In Example 1, the first lens group G1 is made up of a doublet consisting of a negative meniscus lens convex on its object side and a positive meniscus lens convex on its object side, and a positive meniscus lens convex on its object side; the second lens group G2 is made up of two negative meniscus lenses each convex on its object side and a doublet consisting of a negative meniscus lens convex on its object side and a double-convex positive lens; the third lens group G3 is made up of a stop, a double-convex positive lens located in the rear of the stop and a doublet consisting of a negative meniscus lens convex on its object side and a double-convex positive lens; the fourth lens group G4 is made up of one negative meniscus lens convex on its object side, and the fifth lens group G5 is made up of a doublet consisting of a double-convex positive lens and a double-concave negative lens. Three aspheric surfaces are used, one at the surface in the second lens group G2, which is located nearest to the image plane side, one at the surface in the third lens group G3, which is located nearest to the object side, and one at the surface in the fifth lens group G5, which is located nearest to the object side.

EXAMPLE 2

The zoom lens of this example is made up of a first lens group G1 having positive refracting power, a second lens group G2 having negative refracting power, a third lens group G3 having positive refracting power, a fourth lens group G4 having negative refracting power and a fifth lens group G5 having positive refracting power, as shown in FIG. 2. Upon zooming from the wide-angle end to the telephoto end of the zoom lens while focused on an object point at infinity, the first lens group G1 moves toward the object side of the zoom lens and upon arriving at the telephoto end it is positioned nearer to the object side than at the wide-angle end, the second lens group G2 moves toward the image plane side of the zoom lens, the third lens group G3 moves toward the object side, the fourth lens group G4 once moves toward the object side and then moves somewhat toward the image plane side while the spacing between it and the third lens group G3 becomes wide, and the fifth lens group G5 moves toward the object side in a convex locus and upon arriving at the telephoto end it is positioned nearer to the object side than at the wide-angle end.

In Example 2, the first lens group G1 is made up of a doublet consisting of a negative meniscus lens convex on its object side and a double-convex positive lens; the second lens group G2 is made up of a negative meniscus lens convex on its object side and a doublet consisting of a double-concave negative lens and a positive meniscus lens convex on its object side; the third lens group G3 is made up of a stop, a double-convex positive lens located in the rear of the stop and a doublet consisting of a negative meniscus lens convex on its object side and a double-convex positive lens; the fourth lens group G4 is made up of one double-concave negative lens, and the fifth lens group G5 is made up of a doublet consisting of a double-convex positive lens and a negative meniscus lens convex on its image plane side. Two aspheric surfaces are used, one at the surface in the third lens group G3, which is located nearest to the object side, and another at the surface in the fifth lens group G5, which is located nearest to the object side.

EXAMPLE 3

Figure 3:
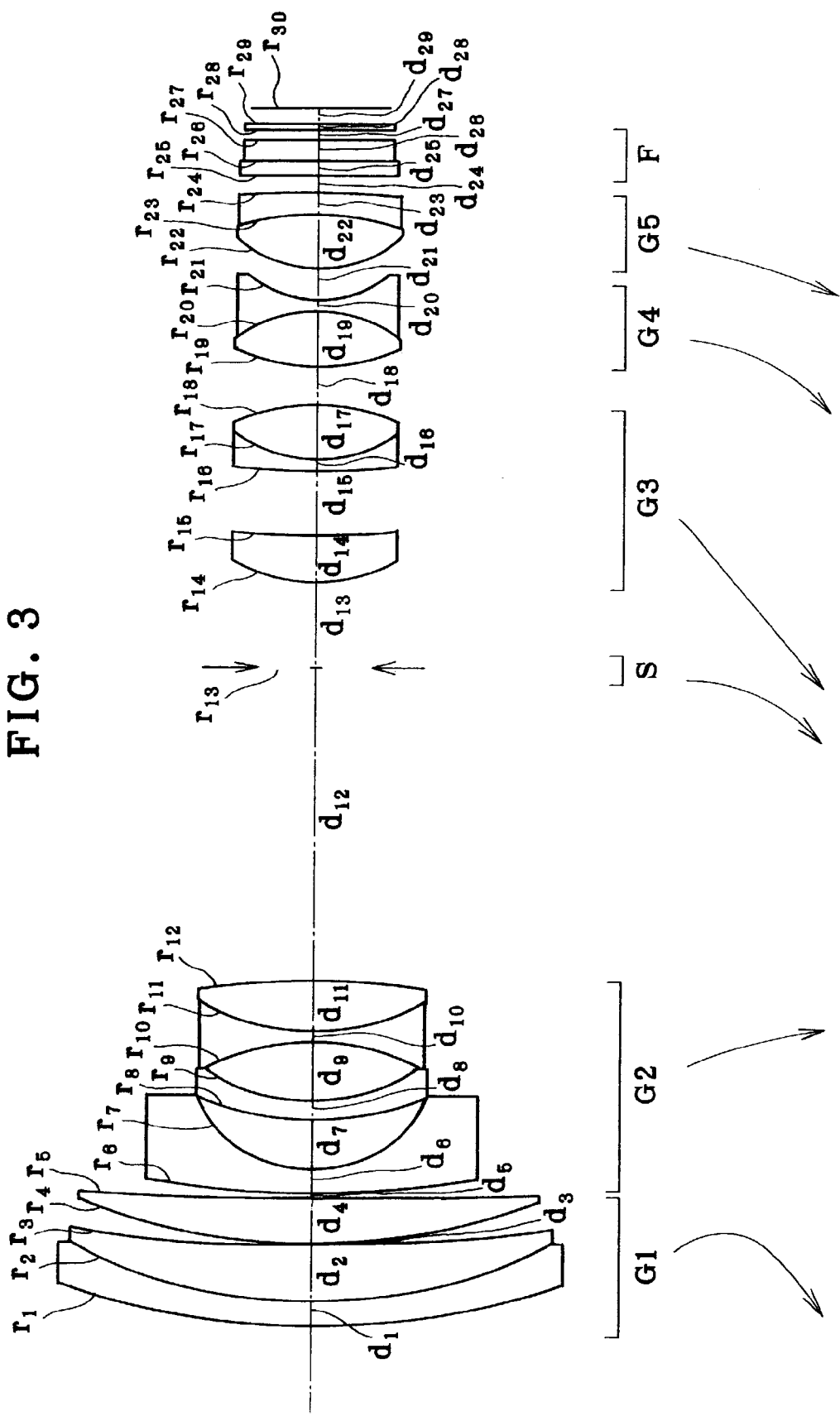
FIG. 3 is illustrative in section of the lens arrangement of Example 3 of the wide-angle, high-zoom-ratio zoom lens of the invention at the wide-angle end upon focused on an object point at infinity.

The zoom lens of this example is made up of a first lens group G1 having positive refracting power, a second lens group G2 having negative refracting power, a third lens group G3 having positive refracting power, a fourth lens group G4 having negative refracting power and a fifth lens group G5 having positive refracting power, as shown in FIG. 3. Upon zooming from the wide-angle end to the telephoto end of the zoom lens while focused on an object point at infinity, the first lens group G1 once moves toward the image plane side of the zoom lens and then moves toward the object side of the zoom lens and upon arriving at the telephoto end it is positioned nearer to the object side than at the wide-angle end, the second lens group G2 moves toward the image plane side, the third lens group G3 moves toward the object side, the fourth lens group G4 moves toward the object side while the spacing between it and the third lens group G3 becomes wide, and the fifth lens group G5 moves toward the object side while the spacing between it and the fourth lens group G4 becomes wide. The stop S is substantially fixed from the wide-angle end to the intermediate state on the object side of the third lens group G3, and moves toward the object side from the intermediate state to the telephoto end.

In Example 3, the first lens group G1 is made up of a doublet consisting of a negative meniscus lens convex on its object side and a positive meniscus lens convex on its object side, and a positive meniscus lens convex on its object side; the second lens group G2 is made up of two negative meniscus lenses each convex on its object side and a doublet consisting of a double-concave negative lens and a double-convex positive lens; the third lens group G3 is made up of a double-convex positive lens and a doublet consisting of a negative meniscus lens convex on its object side and a double-convex positive lens; the fourth lens group G4 is made up of a doublet consisting of a double-convex positive lens and a double-concave negative lens; and the fifth lens group G5 is made up of a doublet consisting of a double-convex positive lens and a negative meniscus lens convex on its image plane side. Three aspheric surfaces are used, one at the image plane side-surface of the second negative meniscus lens in the second lens group G2 as viewed from its object side and two at both surface of the single or double-convex positive lens in the third lens group G3.

EXAMPLE 4

Figure 4:
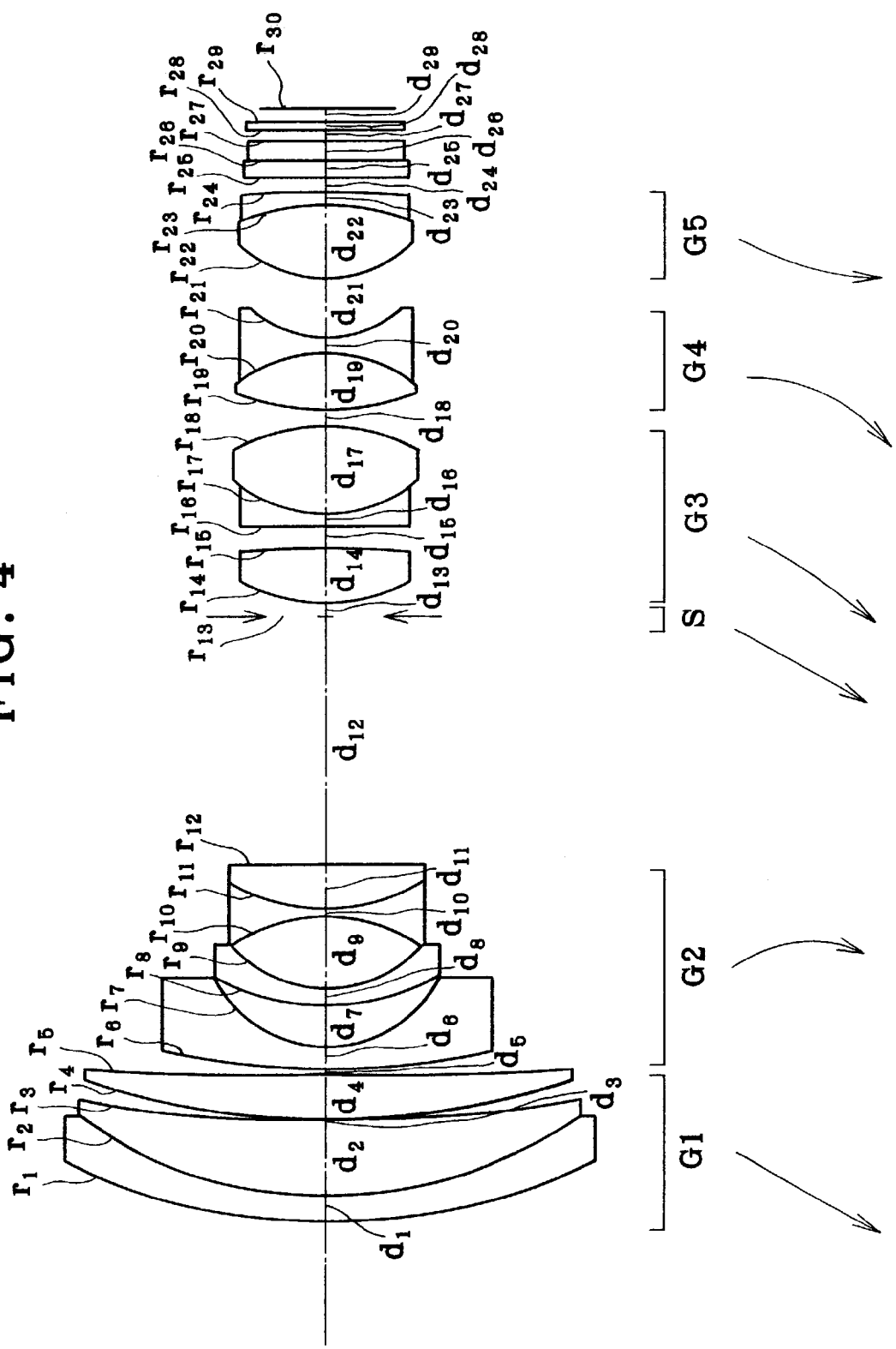
FIG. 4 is illustrative in section of the lens arrangement of Example 4 of the wide-angle, high-zoom-ratio zoom lens of the invention at the wide-angle end upon focused on an object point at infinity.

The zoom lens of this example is made up of a first lens group G1 having positive refracting power, a second lens group G2 having negative refracting power, a third lens group G3 having positive refracting power, a fourth lens group G4 having negative refracting power and a fifth lens group G5 having positive refracting power, as shown in FIG. 4. Upon zooming from the wide-angle end to the telephoto end of the zoom lens while focused on an object point at infinity, the first lens group G1 moves toward the object side of the zoom lens, the second lens group G2 once moves toward the image plane side of the zoom lens and then moves somewhat toward the object side and upon arriving at the telephoto end it is positioned nearer to the image plane side than at the wide-angle end, the third lens group G3 moves toward the object side, the fourth lens group G4 moves toward the object side while the spacing between it and the third lens group G3 becomes wide, and the fifth lens group G5 moves toward the object side while the spacing between it and the fourth lens group G4 becomes once narrow and then wide. The stop S moves nearly with the third lens group G3 on the object side of the third lens group G3.

In Example 4, the first lens group G1 is made up of a doublet consisting of a negative meniscus lens convex on its object side and a positive meniscus lens convex on its object side, and a positive meniscus lens convex on its object side; the second lens group G2 is made up of two negative meniscus lenses each convex on its object side and a doublet consisting of a double-concave negative lens and a double-convex positive lens; the third lens group G3 is made up of a double-convex positive lens and a doublet consisting of a negative meniscus lens convex on its object side and a double-convex positive lens; the fourth lens group G4 is made up of a doublet consisting of a double-convex positive lens and a double-concave negative lens; and the fifth lens group G5 is made up of a doublet consisting of a double-convex positive lens and a negative meniscus lens convex on its image plane side. Three aspheric surfaces are used, one at the image plane side-surface of the second negative meniscus lens in the second lens group G2 as viewed from its object side and two at both surface of the single or double-convex positive lens in the third lens group G3.

Given below are the numerical data about each example. The symbols used hereinafter but not hereinbefore have the following meanings.

The small letter f is the focal length of the lens system, $F_{NO}$ is an F-number, ω is the half angle of view, WE is the wide-angle end, ST is the intermediate state, TE is the telephoto end, $r_1$, $r_2$, . . . are the radii of curvature of the respective lenses (mm), $d_1$, $d_2$, . . . are the spacing between the respective lens surfaces (mm), $n_{d1}$, $n_{d2}$, . . . are the d-line refractive indices of the respective lenses, and $v_{d1}$, $v_{d2}$, . . . are the d-line refractive indices of the respective lenses. Here let x represent an optical axis where the direction of propagation of light is assumed positive, and y represent a direction perpendicular to the optical axis. Then, the configuration of an aspheric surface is given by $$x=(y^2/r)/[1+\{1-(K+1)(y/r)^2\}^{1/2}]+A_4 y^4+A_6 y^6+A_8 y^8+A_{10} y^{10}$$

Here r is the paraxial radius of curvature, K is the conical coefficient, and $A_4$, $A_6$, $A_8$ and $A_{10}$ are the fourth, sixth, eighth and tenth order aspheric coefficients.

| Example 1 | | | |
|---|---|---|---|
| $r_1 = 50.320$ | $d_1 = 2.50$ | $n_{d1} = 1.84666$ | $\nu_{d1} = 23.78$ |
| $r_2 = 37.046$ | $d_2 = 6.00$ | $n_{d2} = 1.48749$ | $\nu_{d2} = 70.23$ |
| $r_3 = 253.141$ | $d_3 = 0.20$ | | |
| $r_4 = 41.496$ | $d_4 = 4.50$ | $n_{d3} = 1.49700$ | $\nu_{d3} = 81.54$ |
| $r_5 = 177.181$ | $d_5 = $ (Variable) | | |
| $r_6 = 95.957$ | $d_6 = 1.20$ | $n_{d4} = 1.77250$ | $\nu_{d4} = 49.60$ |
| $r_7 = 9.485$ | $d_7 = 2.44$ | | |
| $r_8 = 35.617$ | $d_8 = 0.88$ | $n_{d5} = 1.77250$ | $\nu_{d5} = 49.60$ |
| $r_9 = 9.424$ | $d_9 = 2.18$ | | |
| $r_{10} = 115.923$ | $d_{10} = 0.88$ | $n_{d6} = 1.48749$ | $\nu_{d6} = 70.23$ |
| $r_{11} = 15.753$ | $d_{11} = 2.85$ | $n_{d7} = 1.80518$ | $\nu_{d7} = 25.46$ |
| $r_{12} = -1058.871$ (Aspheric) | $d_{12} = $ (Variable) | | |
| $r_{13} = \infty$ (Stop) | $d_{13} = 1.00$ | | |
| $r_{14} = 16.364$ (Aspheric) | $d_{14} = 2.84$ | $n_{d8} = 1.58313$ | $\nu_{d8} = 59.46$ |
| $r_{15} = -79.276$ | $d_{15} = 4.01$ | | |
| $r_{16} = 26.464$ | $d_{16} = 0.80$ | $n_{d9} = 1.84666$ | $\nu_{d9} = 23.78$ |
| $r_{17} = 12.209$ | $d_{17} = 3.12$ | $n_{d10} = 1.49700$ | $\nu_{d10} = 81.54$ |
| $r_{18} = -15.920$ | $d_{18} = $ (Variable) | | |
| $r_{19} = 22.483$ | $d_{19} = 2.09$ | $n_{d11} = 1.48749$ | $\nu_{d11} = 70.23$ |
| $r_{20} = 8.657$ | $d_{20} = $ (Variable) | | |
| $r_{21} = 11.234$ (Aspheric) | $d_{21} = 2.70$ | $n_{d12} = 1.58313$ | $\nu_{d12} = 59.46$ |
| $r_{22} = -4066.203$ | $d_{22} = 1.13$ | $n_{d13} = 1.84666$ | $\nu_{d13} = 23.78$ |
| $r_{23} = 55.243$ | $d_{23} = $ (Variable) | | |
| $r_{24} = \infty$ | $d_{24} = 0.96$ | $n_{d14} = 1.51633$ | $\nu_{d14} = 64.14$ |
| $r_{25} = \infty$ | $d_{25} = 1.28$ | $n_{d15} = 1.54771$ | $\nu_{d15} = 62.84$ |
| $r_{26} = \infty$ | $d_{26} = 0.64$ | | |
| $r_{27} = \infty$ | $d_{27} = 0.40$ | $n_{d16} = 1.51633$ | $\nu_{d16} = 64.14$ |
| $r_{28} = \infty$ | $d_{28} = 1.00$ | | |
| $r_{29} = \infty$ (Image Plane) | | | |

Aspherical Coefficients

12th surface $K = 0.000$
$A_4 = -9.09899 \times 10^{-5}$
$A_6 = -2.71551 \times 10^{-7}$
$A_8 = -1.02468 \times 10^{-8}$
$A_{10} = 0$ 14th surface $K = 0.000$
$A_4 = -1.09972 \times 10^{-4}$
$A_6 = 2.07929 \times 10^{-7}$
$A_8 = -6.09196 \times 10^{-9}$
$A_{10} = 0$ 21th surface $K = 0.000$
$A_4 = -3.43303 \times 10^{-5}$
$A_6 = 3.23131 \times 10^{-7}$
$A_8 = -7.08478 \times 10^{-9}$
$A_{10} = 0$ Zooming Data ($\infty$)

| | WE | ST | TE |
|---|---|---|---|
| f (mm) | 5.91 | 18.24 | 57.59 |
| $F_{NO}$ | 2.80 | 3.59 | 4.20 |
| $\omega$ (°) | 37.8 | 13.5 | 4.3 |
| $d_5$ | 1.20 | 18.14 | 38.87 |
| $d_{12}$ | 22.56 | 6.10 | 1.00 |
| $d_{18}$ | 1.00 | 3.78 | 7.81 |
| $d_{20}$ | 1.83 | 5.24 | 10.83 |
| $d_{23}$ | 6.29 | 9.79 | 5.36 |

Example 2

| | | | |
|---|---|---|---|
| $r_1 = 44.031$ | $d_1 = 2.30$ | $n_{d1} = 1.80518$ | $\nu_{d1} = 25.42$ |
| $r_2 = 32.519$ | $d_2 = 7.41$ | $n_{d2} = 1.48749$ | $\nu_{d2} = 70.23$ |
| $r_3 = -73030.000$ | $d_3 = $ (Variable) | | |
| $r_4 = 43.698$ | $d_4 = 2.20$ | $n_{d3} = 1.72916$ | $\nu_{d3} = 54.68$ |
| $r_5 = 10.143$ | $d_5 = 5.84$ | | |
| $r_6 = -94.830$ | $d_6 = 1.28$ | $n_{d4} = 1.48749$ | $\nu_{d4} = 70.23$ |
| $r_7 = 11.500$ | $d_7 = 2.29$ | $n_{d5} = 1.84666$ | $\nu_{d5} = 23.78$ |
| $r_8 = 17.005$ | $d_8 = $ (Variable) | | |
| $r_9 = \infty$ (Stop) | $d_9 = 0.80$ | | |
| $r_{10} = 12.368$ (Aspheric) | $d_{10} = 5.12$ | $n_{d6} = 1.69350$ | $\nu_{d6} = 53.20$ |
| $r_{11} = -34.920$ | $d_{11} = 0.26$ | | |
| $r_{12} = 12.095$ | $d_{12} = 1.00$ | $n_{d7} = 1.76182$ | $\nu_{d7} = 26.52$ |
| $r_{13} = 6.605$ | $d_{13} = 3.91$ | $n_{d8} = 1.49700$ | $\nu_{d8} = 81.54$ |
| $r_{14} = -33.193$ | $d_{14} = $ (Variable) | | |
| $r_{15} = -31.694$ | $d_{15} = 1.21$ | $n_{d9} = 1.77250$ | $\nu_{d9} = 49.60$ |
| $r_{16} = 7.725$ | $d_{16} = $ (Variable) | | |
| $r_{17} = 11.937$ (Aspheric) | $d_{17} = 5.24$ | $n_{d10} = 1.58313$ | $\nu_{d10} = 59.46$ |
| $r_{18} = -12.844$ | $d_{18} = 1.09$ | $n_{d11} = 1.84666$ | $\nu_{d11} = 23.78$ |
| $r_{19} = -20.241$ | $d_{19} = $ (Variable) | | |
| $r_{20} = \infty$ | $d_{20} = 1.20$ | $n_{d12} = 1.51633$ | $\nu_{d12} = 64.14$ |
| $r_{21} = \infty$ | $d_{21} = 1.60$ | $n_{d13} = 1.54771$ | $\nu_{d13} = 62.84$ |
| $r_{22} = \infty$ | $d_{22} = 0.80$ | | |
| $r_{23} = \infty$ | $d_{23} = 0.50$ | $n_{d14} = 1.51633$ | $\nu_{d14} = 64.14$ |
| $r_{24} = \infty$ | $d_{24} = 1.00$ | | |
| $r_{25} = \infty$ (Image Plane) | | | |

Aspherical Coefficients 10 th surface $K = 0.000$
$A_4 = -9.58801 \times 10^{-5}$
$A_6 = -4.49970 \times 10^{-7}$
$A_8 = 3.98710 \times 10^{-9}$
$A_{10} = 0$ 17 th surface $K = 0.000$
$A_4 = -1.07599 \times 10^{-4}$
$A_6 = 6.44468 \times 10^{-7}$
$A_8 = -8.77307 \times 10^{-9}$
$A_{10} = 0$ Zooming Data ($\infty$)

| | WE | ST | TE |
|---|---|---|---|
| f (mm) | 7.28 | 16.10 | 34.80 |
| $F_{NO}$ | 2.80 | 3.34 | 3.79 |
| $\omega$ (°) | 38.0 | 18.8 | 8.8 |
| $d_3$ | 1.20 | 17.92 | 38.62 |
| $d_8$ | 25.04 | 10.30 | 2.45 |
| $d_{14}$ | 1.00 | 1.88 | 4.67 |
| $d_{16}$ | 2.95 | 4.75 | 6.20 |
| $d_{19}$ | 2.28 | 5.52 | 4.02 |

Example 3

| | | | |
|---|---|---|---|
| $r_1 = 64.6139$ | $d_1 = 2.3000$ | $n_{d1} = 1.84666$ | $\nu_{d1} = 23.78$ |
| $r_2 = 44.6075$ | $d_2 = 4.4786$ | $n_{d2} = 1.72916$ | $\nu_{d2} = 54.68$ |
| $r_3 = 139.8235$ | $d_3 = 0.2000$ | | |
| $r_4 = 54.6768$ | $d_4 = 3.6987$ | $n_{d3} = 1.48749$ | $\nu_{d3} = 70.23$ |
| $r_5 = 424.5002$ | $d_5 = $ (Variable) | | |
| $r_6 = 125.5236$ | $d_6 = 1.7000$ | $n_{d4} = 1.77250$ | $\nu_{d4} = 49.60$ |
| $r_7 = 10.8001$ | $d_7 = 4.2447$ | | |
| $r_8 = 29.7557$ | $d_8 = 1.5000$ | $n_{d5} = 1.48749$ | $\nu_{d5} = 70.23$ |
| $r_9 = 13.3352$ (Aspheric) | $d_9 = 4.9094$ | | |
| $r_{10} = -21.4004$ | $d_{10} = 1.0000$ | $n_{d6} = 1.49700$ | $\nu_{d6} = 81.54$ |
| $r_{11} = 20.1217$ | $d_{11} = 4.2899$ | $n_{d7} = 1.83400$ | $\nu_{d7} = 37.16$ |
| $r_{12} = -56.7651$ | $d_{12} = $ (Variable) | | |
| $r_{13} = \infty$ (Stop) | $d_{13} = $ (Variable) | | |
| $r_{14} = 16.0065$ (Aspheric) | $d_{14} = 4.0000$ | $n_{d8} = 1.69350$ | $\nu_{d8} = 53.20$ |
| $r_{15} = -335.7378$ (Aspheric) | $d_{15} = 5.0507$ | | |
| $r_{16} = 67.2996$ | $d_{16} = 1.0000$ | $n_{d9} = 1.84666$ | $\nu_{d9} = 23.78$ |
| $r_{17} = 11.5559$ | $d_{17} = 4.3144$ | $n_{d10} = 1.49700$ | $\nu_{d10} = 81.54$ |
| $r_{18} = -19.7596$ | $d_{18} = $ (Variable) | | |
| $r_{19} = 20.3691$ | $d_{19} = 4.0249$ | $n_{d11} = 1.84666$ | $\nu_{d11} = 23.78$ |
| $r_{20} = -13.0853$ | $d_{20} = 1.0000$ | $n_{d12} = 1.80100$ | $\nu_{d12} = 34.97$ |
| $r_{21} = 9.4645$ | $d_{21} = $ (Variable) | | |

-continued

| | | | |
|---|---|---|---|
| $r_{22} = 10.3538$ | $d_{22} = 4.3519$ | $n_{d13} = 1.49700$ | $\nu_{d13} = 81.54$ |
| $r_{23} = -25.4846$ | $d_{23} = 1.7726$ | $n_{d14} = 1.84666$ | $\nu_{d14} = 23.78$ |
| $r_{24} = -162.1488$ | $d_{24} = $ (Variable) | | |
| $r_{25} = \infty$ | $d_{15} = 1.2000$ | $n_{d15} = 1.51633$ | $\nu_{d15} = 64.14$ |
| $r_{26} = \infty$ | $d_{16} = 1.6000$ | $n_{d16} = 1.54771$ | $\nu_{d16} = 62.84$ |
| $r_{27} = \infty$ | $d_{17} = 0.8000$ | | |
| $r_{28} = \infty$ | $d_{18} = 0.5000$ | $n_{d17} = 1.51633$ | $\nu_{d17} = 64.14$ |
| $r_{29} = \infty$ | $d_{19} = 1.0000$ | | |
| $r_{30} = \infty$ (Image Plane) | | | |

Aspherical Coefficients

9th surface $K = 0$
$A_4 = -6.7746 \times 10^{-5}$
$A_6 = -1.4541 \times 10^{-7}$
$A_8 = -2.4739 \times 10^{-9}$
$A_{10} = -1.7304 \times 10^{-11}$ 14th surface $K = 0$
$A_4 = 9.9017 \times 10^{-6}$
$A_6 = 8.1793 \times 10^{-7}$
$A_8 = -1.0604 \times 10^{-8}$
$A_{10} = 1.4797 \times 10^{-10}$ 15th surface $K = 0$
$A_4 = 7.5716 \times 10^{-5}$
$A_6 = 8.1779 \times 10^{-7}$
$A_8 = -6.9340 \times 10^{-9}$
$A_{10} = 1.3677 \times 10^{-10}$ Zooming Data ($\infty$)

| | WE | ST | TE |
|---|---|---|---|
| f (mm) | 7.27 | 15.80 | 34.90 |
| $F_{NO}$ | 2.40 | 2.94 | 3.50 |
| $\omega$ (°) | 39.19 | 19.59 | 9.27 |
| $d_5$ | 0.56078 | 12.61730 | 28.38006 |
| $d_{12}$ | 26.11792 | 11.29236 | 1.60000 |
| $d_{13}$ | 7.32085 | 0.89591 | 0.80000 |
| $d_{18}$ | 3.26737 | 6.51304 | 10.81004 |
| $d_{21}$ | 2.57946 | 3.15765 | 5.84548 |
| $d_{24}$ | 1.20788 | 3.49336 | 3.63927 |

Example 4

| | | | |
|---|---|---|---|
| $r_1 = 46.1005$ | $d_1 = 2.3000$ | $n_{d1} = 1.84666$ | $\nu_{d1} = 23.78$ |
| $r_2 = 34.3761$ | $d_2 = 5.9726$ | $n_{d2} = 1.48749$ | $\nu_{d2} = 70.23$ |
| $r_3 = 117.4565$ | $d_3 = 0.2000$ | | |
| $r_4 = 63.0050$ | $d_4 = 3.3423$ | $n_{d3} = 1.75985$ | $\nu_{d3} = 51.36$ |
| $r_5 = 325.9279$ | $d_5 = $ (Variable) | | |
| $r_6 = 59.8701$ | $d_6 = 1.7000$ | $n_{d4} = 1.77250$ | $\nu_{d4} = 49.60$ |
| $r_7 = 10.2502$ | $d_7 = 3.2639$ | | |
| $r_8 = 19.2348$ | $d_8 = 1.5000$ | $n_{d5} = 1.48749$ | $\nu_{d5} = 70.23$ |
| $r_9 = 10.5767$ (Aspheric) | $d_9 = 5.1252$ | | |
| $r_{10} = -16.6188$ | $d_{10} = 1.0000$ | $n_{d6} = 1.49700$ | $\nu_{d6} = 81.54$ |
| $r_{11} = 16.4220$ | $d_{11} = 3.4870$ | $n_{d7} = 1.84418$ | $\nu_{d7} = 26.48$ |
| $r_{12} = -4946.4187$ | $d_{12} = $ (Variable) | | |
| $r_{13} = \infty$ (Stop) | $d_{13} = $ (Variable) | | |
| $r_{14} = 14.5337$ (Aspheric) | $d_{14} = 4.5000$ | $n_{d8} = 1.69248$ | $\nu_{d8} = 53.27$ |
| $r_{15} = -48.0115$ (Aspheric) | $d_{15} = 1.5677$ | | |
| $r_{16} = 226.1916$ | $d_{16} = 1.0000$ | $n_{d9} = 1.84666$ | $\nu_{d9} = 23.78$ |
| $r_{17} = 11.5905$ | $d_{17} = 7.1160$ | $n_{d10} = 1.49700$ | $\nu_{d10} = 81.54$ |
| $r_{18} = -14.9646$ | $d_{18} = $ (Variable) | | |
| $r_{19} = 21.3539$ | $d_{19} = 4.2958$ | $n_{d11} = 1.84666$ | $\nu_{d11} = 23.78$ |
| $r_{20} = -12.7046$ | $d_{20} = 1.0000$ | $n_{d12} = 1.80100$ | $\nu_{d12} = 34.97$ |
| $r_{21} = 9.5418$ | $d_{21} = $ (Variable) | | |
| $r_{22} = 10.7698$ | $d_{22} = 5.5000$ | $n_{d13} = 1.49700$ | $\nu_{d13} = 81.54$ |
| $r_{23} = -21.2597$ | $d_{23} = 1.0000$ | $n_{d14} = 1.84666$ | $\nu_{d14} = 23.78$ |
| $r_{24} = -103.7772$ | $d_{24} = $ (Variable) | | |
| $r_{25} = \infty$ | $d_{15} = 1.2000$ | $n_{d15} = 1.51633$ | $\nu_{d15} = 64.14$ |
| $r_{26} = \infty$ | $d_{16} = 1.6000$ | $n_{d16} = 1.54771$ | $\nu_{d16} = 62.84$ |
| $r_{27} = \infty$ | $d_{17} = 0.8000$ | | |
| $r_{28} = \infty$ | $d_{18} = 0.5000$ | $n_{d17} = 1.51633$ | $\nu_{d17} = 64.14$ |
| $r_{29} = \infty$ | $d_{19} = 1.0000$ | | |
| $r_{30} = \infty$ (Image Plane) | | | |

Aspherical Coefficients

9th surface $K = 0$
$A_4 = -6.9623 \times 10^{-5}$
$A_6 = 6.0033 \times 10^{-7}$
$A_8 = -2.4934 \times 10^{-8}$
$A_{10} = 2.3313 \times 10^{-10}$ 14th surface $K = 0$
$A_4 = -1.7198 \times 10^{-5}$
$A_6 = 7.9988 \times 10^{-7}$
$A_8 = -5.9751 \times 10^{-9}$
$A_{10} = 1.6650 \times 10^{-10}$ 15th surface $K = 0$
$A_4 = 1.0973 \times 10^{-4}$
$A_6 = 8.3923 \times 10^{-7}$
$A_8 = -6.8836 \times 10^{-9}$
$A_{10} = 2.6572 \times 10^{-10}$ Zooming Data ($\infty$)

| | WE | ST | TE |
|---|---|---|---|
| f (mm) | 7.27 | 15.80 | 34.90 |
| $F_{NO}$ | 2.40 | 2.60 | 2.80 |
| $\omega$ (°) | 39.15 | 19.48 | 9.10 |
| $d_5$ | 0.48000 | 12.54231 | 28.34515 |
| $d_{12}$ | 19.98765 | 7.08603 | 1.60000 |
| $d_{13}$ | 1.01460 | 0.80000 | 0.80000 |
| $d_{18}$ | 1.00000 | 5.72378 | 10.17114 |
| $d_{21}$ | 4.56508 | 3.94182 | 6.70040 |
| $d_{24}$ | 1.00000 | 3.33102 | 3.40282 |

Figures 5A, 5B, 5C:
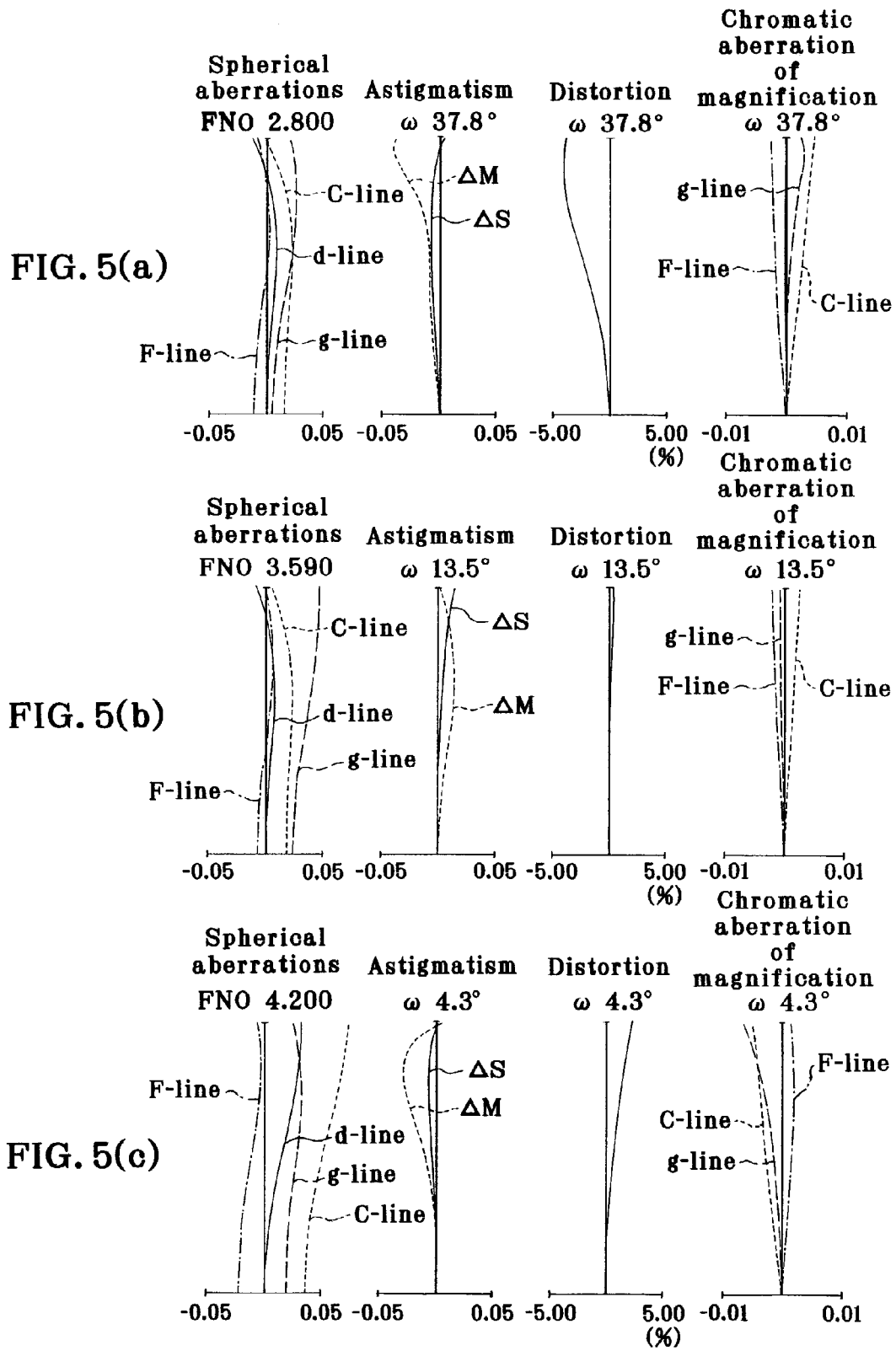
FIGS. 5(a), 5(b) and 5(c) are aberration diagrams for Example 1 at the wide-angle end (a), in the intermediate settings (b) and the telephoto end (c) upon focused at infinity.

In FIGS. 5 and 6 there are shown aberration diagrams for Examples 1 and 2 upon focused at infinity with (a), (b) and (c) indicative of aberrations at the wide-angle end, in the intermediate state and at the telephoto end, respectively.

Next, the values of the parameters concerning conditions (1) to (27) in Examples 1 to 4 are enumerated below.

| | Example 1 | Example 2 | Example 3 | Example 4 |
|---|---|---|---|---|
| $L_{g4}/f_W$ | 0.355 | 0.166 | 0.691 | 0.7285 |
| $L_{g4}$ | 2.095 | 1.206 | 5.025 | 5.296 |
| $f_W$ | 5.906 | 7.283 | 7.27 | 7.27 |
| $RH_{5W}/RH_{4W}$ | 1.202 | 1.822 | 1.276 | 1.626 |
| $RH_{5T}/RH_{4T}$ | 1.982 | 2.548 | 1.655 | 1.728 |
| $RH_{4W}$ | 2.396 | 1.977 | 4.09 | 3.066 |
| $RH_{5W}$ | 2.879 | 3.603 | 5.22 | 4.984 |
| $RH_{4T}$ | 2.265 | 1.967 | 3.48 | 3.277 |
| $RH_{5T}$ | 4.491 | 5.012 | 5.76 | 5.662 |
| $D_{45W}/f_W$ | 0.310 | 0.405 | 0.355 | 0.628 |
| $D_{45T}/f_T$ | 0.188 | 0.178 | 0.168 | 0.192 |
| $D_{45W}$ | 1.832 | 2.948 | 2.58 | 4.565 |
| $D_{45T}$ | 10.828 | 6.200 | 5.85 | 6.700 |
| $f_1/f_W$ | 11.800 | 15.689 | 10.593 | 10.20 |
| $f_1$ | 69.690 | 114.268 | 77.01 | 74.155 |
| $f_2/f_W$ | -1.602 | -1.589 | -1.927 | -1.376 |
| $f_2$ | -9.463 | -11.574 | -14.01 | -10 |
| $f_3/f_W$ | 2.568 | 1.354 | 2.875 | 2.33 |
| $f_3$ | 15.169 | 9.863 | 20.90 | 16.949 |
| $f_4/f_W$ | -5.145 | -1.089 | -4.567 | -4.396 |
| $f_4$ | -30.386 | -7.934 | -33.20 | -31.957 |
| $f_5/f_W$ | 4.414 | 2.082 | 3.396 | 3.516 |

-continued

| | Example 1 | Example 2 | Example 3 | Example 4 |
|---|---|---|---|---|
| $f_5$ | 26.067 | 15.167 | 24.69 | 25.562 |
| $N_{d11}$ | 1.48749 | 1.48749 | 1.48749 | 1.48749 |
| | 1.49700 | | | |
| $v_{d11}$ | 70.23 | 70.23 | 70.23 | 70.23 |
| | 81.54 | | | |
| $N_{d31}$ | 1.497 | 1.497 | 1.49699 | 1.49699 |
| $v_{d31}$ | 81.54 | 81.54 | 81.5 | 81.5 |
| $SF_{4g}$ | 2.252 | 0.608 | 2.74 | 2.616 |
| $\Delta\beta_3/\Delta\beta_2$ | 0.548 | 1.494 | 1.164 | 1.124 |
| $\Delta\beta_2$ | 3.884 | 1.713 | 1.995 | 2.050 |
| $\Delta\beta_3$ | 2.130 | 2.559 | 2.323 | 2.304 |
| $L_W/IH$ | 17.832 | 14.092 | 17.54 | 15.268 |
| $L_W$ | 78.461 | 77.504 | 100.00 | 87.028 |
| IH | 4.400 | 5.500 | 5.7 | 5.7 |
| $d_{45W}/f_5$ | 0.070 | 0.194 | 0.1045 | 0.179 |
| $d_{45W}$ | 1.832 | 2.948 | 2.579 | 4.565 |
| $N_{dFS}$ | 1.49700 | — | 1.49699 | 1.49699 |
| $v_{dFS}$ | 81.54 | — | 81.5 | 81.54 |
| $N_{dRS}$ | 1.49700 | 1.49700 | 1.49699 | 1.49699 |
| $v_{dRS}$ | 81.54 | 81.54 | 81.5 | 81.54 |
| $SF_{22}$ | 1.720 | — | 2.624 | 3.44 |
| $R_{2ce}/f_2$ | −1.665 | −0.994 | −1.436 | −1.6422 |
| $R_{2ce}$ | 15.753 | 11.500 | 20.122 | 16.422 |
| $R_{1b}/R_{2f}$ | 1.846 | −1671.251 | 3.382 | 5.444 |
| $R_{1b}$ | 177.181 | −73030.000 | 424.5 | 325.9279 |
| $R_{2f}$ | 95.957 | 43.698 | 125.524 | 59.8701 |
| Z | 9.74 | 4.78 | 4.80 | 4.80 |
| $\omega_W$ | 37.8 | 38.0 | 39.19 | 39.15 |

The wide-angle, high-zoom-ratio zoom of the invention may be used with phototaking systems wherein an object image formed through a zoom lens is received on an electronic image pickup device such as a CCD for phototaking purposes, inter alia, digital or video cameras, personal computers represented by personal digital assistants and telephones, especially convenient-to-carry cellular phones.

Figure 7:
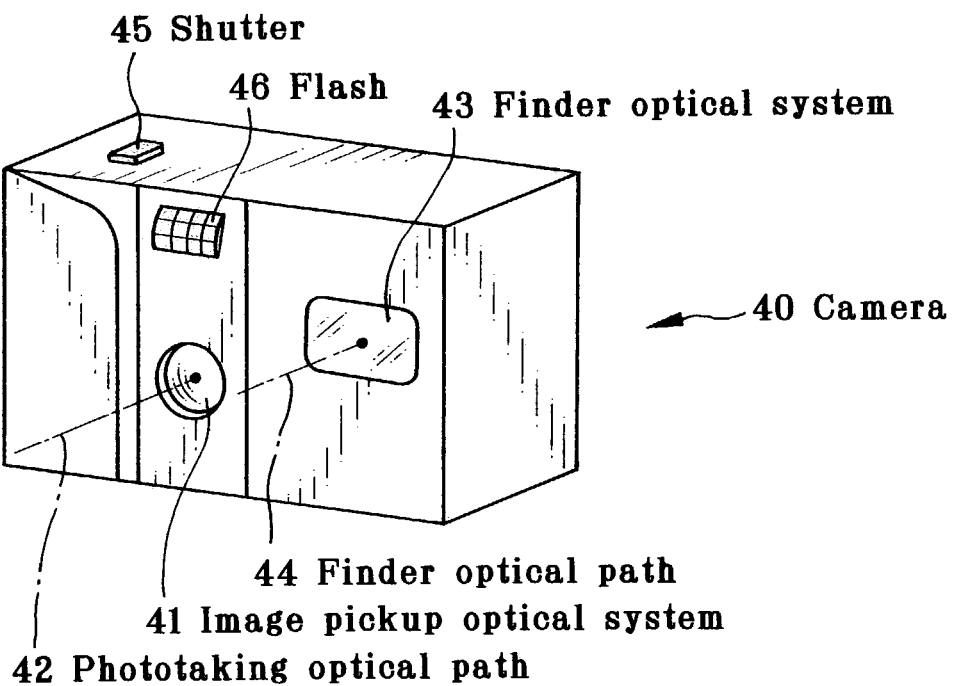
Figure 8:
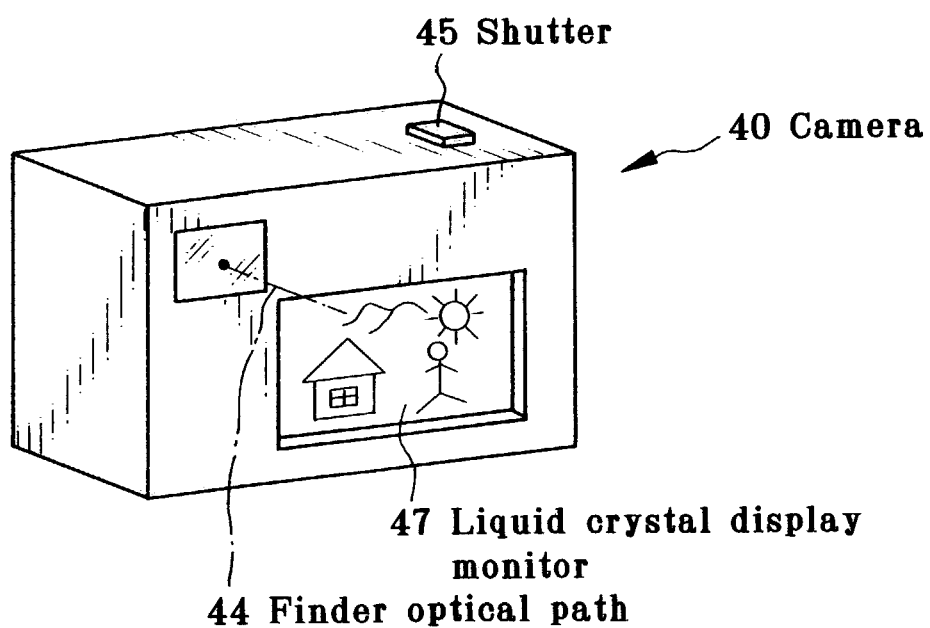
FIG. 8 is a rear perspective schematic of the FIG. 7 digital camera.
Figure 9:
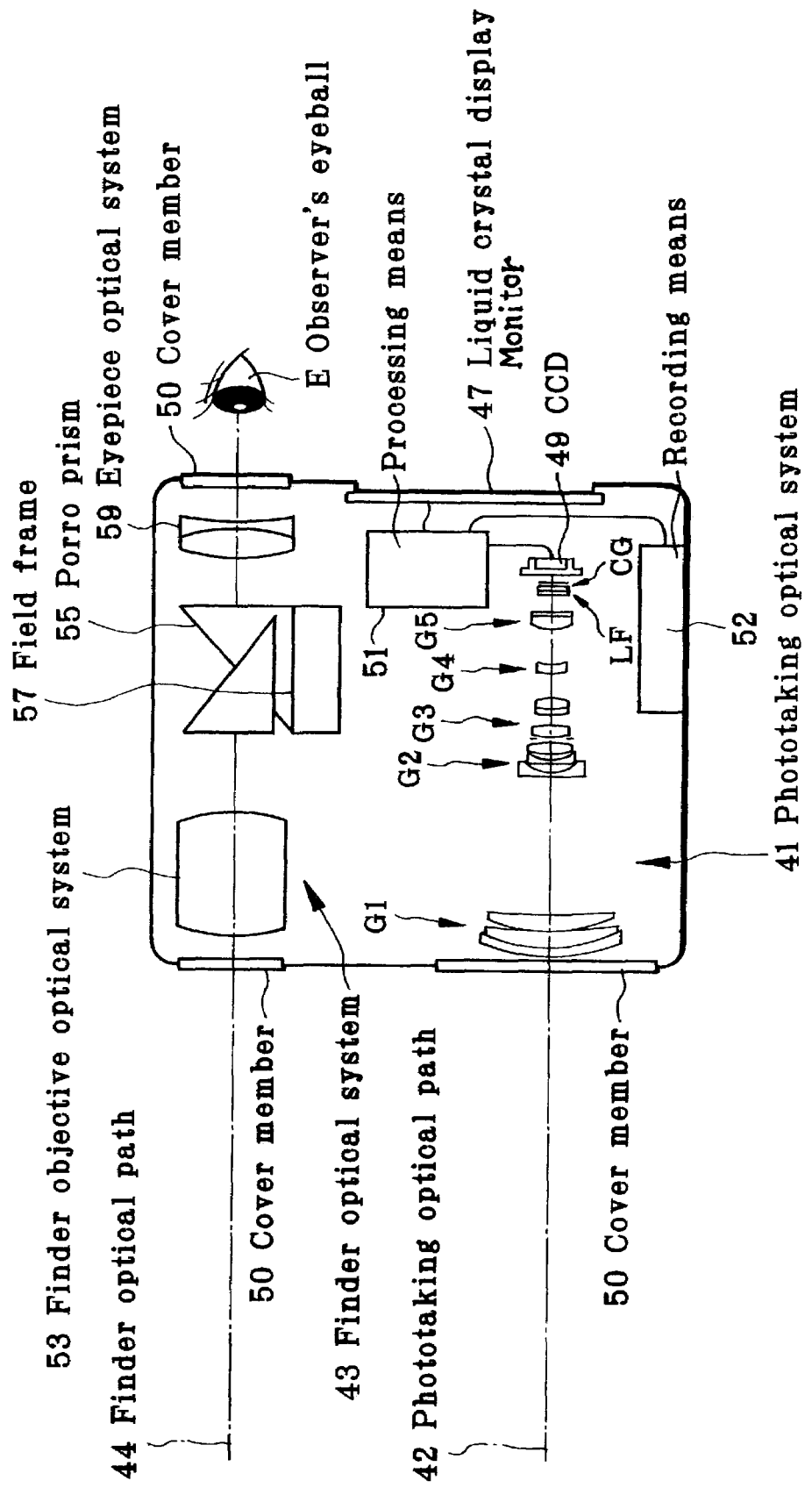
FIG. 9 is a sectional schematic of the FIG. 7 digital camera.

FIGS. 7–9 are illustrative in conception of the construction of a phototaking optical system 41 of a digital camera, in which the zoom lens of the invention is built. FIGS. 7 and 8 are a front and a rear perspective view of a digital camera 40, respectively, and FIG. 9 is a sectional view of the construction of the digital camera 40. In this case, the digital camera 40 comprises a phototaking optical system 41 including a phototaking optical path 42, a finder optical system 43 including a finder optical path 44, a shutter 45, a flash 46, a liquid crystal monitor 47, etc. As the shutter 45 mounted on top of the camera 40 is pressed down, phototaking takes place through the phototaking optical system 41, e.g., the zoom lens of Example 1. An object image formed by the photo-taking optical system 41 is formed on an image pickup surface of CCD 49 via an optical low-pass filter LF and a cover glass CG. The object image received at CCD 49 is shown as an electronic image on the liquid crystal monitor 47 mounted on the back of the camera via processing means 51. The processing means 51 may be connected with recording means 52 to record that electronic image. It is noted that the recording means 52 may be provided separately from the processing means 51 or, alternatively, it may be designed in such a way that the image is electronically recorded or written in floppy disks, memory cards, MOs, etc. It is also noted that the camera 40 may be designed as a silver-halide camera by using a silver-halide film in place of CCD 49.

On the finder optical path 44 there is a finder objective optical system 53. An object image formed through the finder objective optical system 53 is formed on a field frame 57 of a Porro prism 55 that is an image erection member. In the rear of the Porro prism 55, there is located an eyepiece optical system 59 for guiding the erected image into the eyeball E of an observer. It is here noted that cover members 50 are located on the entrance sides of the phototaking optical system 41 and finder optical system 53 while a cover member 50 is located on the exit side of the eyepiece optical system 59.

With the thus constructed digital camera 40, high performance and cost reductions are achievable because the phototaking optical system 41 used ensures wide-angle performance, high zoom ratios and improvements in aberrations and is fast with a back focus large enough to receive filters, etc. therein.

In the embodiment of FIG. 9, parallel-plane plates are used as the cover members 50; however, it is acceptable to use powered lenses.

As can be seen from the foregoing, the present invention can provide a four- or five-group zoom lens that ensures wide-angle performance, high zoom ratios and high quality with a limited number of lenses, in which the negative lens element having strong power is located in the fourth movable lens groups to flip up a light beam, so that there is no need of locating any negative lens element having strong power in the third lens group and fluctuations of aberrations can be minimized.

What we claim is:

1. A zoom lens comprising, in order from an object side thereof a first lens group having positive power, a second lens group having negative power, said second lens group moving during zooming, a third lens group having positive power, a fourth lens group having negative power and a fifth lens group having positive power, said fourth lens group consisting of one single lens element, wherein:
    said zoom lens is a five-unit zoom lens; and
    zooming is carried out by varying all spacings between said lens groups, and said first lens group moves in such a way as to arrive at the object side of the zoom lens at a telephoto end position rather than at a wide-angle end position, wherein said third lens group comprises at least one negative lens element and up to two positive lens elements and comprises a total of up to three lens elements.

2. The zoom lens according to claim 1, which satisfies the following condition (1):

$$0.1 < Lg4/f_W < 0.45 \tag{1}$$

where Lg4 is a thickness of the fourth lens group, and $f_W$ is a focal length of the zoom lens at the wide-angle end.

3. The zoom lens according to claim 1, which satisfies the following condition (9):

$$-5.5 < f_4/f_W < -0.5 \tag{9}$$

where $f_4$ is a focal length of the fourth lens group, and $f_W$ is a focal length of the zoom lens at the wide-angle end.

4. The zoom lens according to claim 1, wherein:
    a negative lens element in the third lens group is cemented to another lens element.

5. The zoom lens according to claim 1, wherein:
    at least one positive lens element in the third lens group satisfies the following conditions (13) and (14):

$$Nd31 < 1.53 \tag{13}$$

$$vd31 > 78 \tag{14}$$

where Nd31 is a d-line refractive index of at least one positive lens element in the third lens group, and vd31 is a d-line Abbe number of at least one positive lens element in the third lens group.

6. The zoom lens according to claim 1, which further comprises a stop and satisfies the following conditions (19) to (22):

$$N_{dFS} < 1.53 \quad (19)$$

$$v_{dFS} > 78 \quad (20)$$

$$N_{dRS} < 1.53 \quad (21)$$

$$v_{dRS} > 78 \quad (22)$$

where $N_{dFS}$ is a d-line refractive index of at least one lens element located in front of the stop, $v_{dFS}$ is a d-line Abbe number of at least one lens element located in front of the stop, $N_{dRS}$ is a d-line refractive index of at least one lens element located in the rear of the stop, and $v_{dRS}$ is a d-line Abbe number of at least one lens element located in the rear of the stop.

7. The zoom lens according to claim 1, wherein:
the second lens group consists of, in order from an object side thereof, a negative lens element, a negative lens element, a negative lens element and a positive lens element or four lens elements in all.

8. The zoom lens according to claim 7, which satisfies the following condition (23):

$$1.0 \leq SF22 \quad (23)$$

where $SF_{22} = (Rf+Rb)/(Rf-Rb)$ wherein Rf is an axial radius of curvature of a front surface of the second lens element in the second lens group as viewed from an object side thereof, and Rb is an axial radius of curvature of a rear surface of the second lens in the second lens group as viewed from an object side thereof.

9. The zoom lens according to claim 1, wherein:
said second lens group comprises a doublet component having a cemented surface and satisfies the following condition (24):

$$-2.0 < R2ce/f_2 < -0.5 \quad (24)$$

where R2ce is an axial radius of curvature of the cemented surface in the second lens group, and $f_2$ is a focal length of the second lens group.

10. The zoom lens according to claim 1, which satisfies the following condition (25):

$$1.4 < R1b/R2f < 3.0 \quad (25)$$

where R1b is an axial radius of curvature of a final surface in the first lens group, and R2f is an axial radius of curvature of a forefront surface in the second lens group.

11. An image pickup system, which comprises the zoom lens according to claim 1 and an image pickup device located on an image side thereof.

12. The zoom lens according to claim 1, wherein said second lens group moves toward the image side upon zooming from the wide-angle end to the telephoto end.

13. The zoom lens according to claim 1, wherein said second lens group moves monotonously toward the image side upon zooming from the wide-angle end to the telephoto end.

14. The zoom lens according to claim 1, wherein said second lens group moves in a convex locus toward the image side upon zooming from the wide-angle end to the telephoto end.

15. The zoom lens according to claim 1, wherein said second lens group moves in a concave locus toward the image side upon zooming from the wide-angle end to the telephoto end.

16. A zoom lens according to claim 1,
wherein said third lens group comprises two positive lens elements.

17. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:
said zoom lens is a five-unit zoom lens; and
zooming is carried out by varying all spacings between said lens groups, and said first lens group moves in such a way as to arrive at the object side of the zoom lens at a telephoto end position rather than at a wide-angle end position, wherein said fifth lens group comprises up to two lens elements.

18. A zoom lens according to claim 17,
wherein said third lens group comprises two positive lens elements, and wherein said fourth lens group consists of one single lens element.

19. A zoom lens comprising, in order from an object side thereof, a first lens group having positive power, a second lens group having negative power, a third lens group having positive power, a fourth lens group having negative power, said fourth lens group consisting of one lens component, and a fifth lens group having positive power, wherein:
said zoom lens is a five-unit zoom lens;
zooming is carried out by varying all spacings between said lens groups, said first lens group moves in such a way as to arrive at the object side of said zoom lens at a telephoto end position rather than at a wide-angle end position, and upon zooming from the wide-angle end to the telephoto end the spacing between said fourth lens group and said fifth lens group increases monotonically; and
said first lens group, said second lens group, said third lens group, said fourth lens group and said fifth lens group move for the zooming.

20. An image pickup system, which comprises the zoom lens according to claim 19 and an image pickup device located on an image side thereof.

21. The zoom lens according to claim 19, which further comprises a stop that is movable together with the third lens group.

22. A zoom lens according to claim 19,
wherein said third lens group comprises two positive lens elements, and wherein said fourth lens group consists of one single lens element.

23. A zoom lens comprising, in order from an object side thereof, a first lens group having positive power, a second lens group having negative power, a third lens group having positive power and a fourth lens group having positive power in which zooming is carried out by varying all spacings between said lens groups and said first lens group moves in such a way as to arrive at the object side of said zoom lens at a telephoto end position rather than at a wide-angle end position, wherein:
said third lens group consists of a front subunit and a rear subunit, said front subunit in said third lens group comprising two positive lens elements, and said rear subunit in said third lens group consists of one lens element and said front subunit and rear subunit in said third lens group move independently during zooming.

24. An image pickup system, which comprises the zoom lens according to claim 23 and an image pickup device located on an image side thereof.

25. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:

said zoom lens is a five-unit zoom lens; and zooming is carried out by varying all spacings between said lens groups, and said first lens group moves in such a way as to arrive at the object side of the zoom lens at a telephoto end position rather than at a wide-angle end position, which satisfies the following conditions (2) and (3):

$$0.8 < RH5W/RH4W < 3.0 \quad (2)$$

$$1.0 < RH5T/RH4T < 3.5 \quad (3)$$

where RH4W is a height of a farthest off-axis chief ray at the wide-angle end upon leaving a rearmost surface in the fourth lens group, RH5W is a height of a farthest off-axis chief ray at the wide-angle end upon incidence on a forefront surface in the fifth lens group, RH4T is a height of the farthest off-axis chief ray at the telephoto end upon leaving the rearmost surface in the fourth lens group, and RH5T is a height of the farthest off-axis chief ray at the telephoto end upon incidence on the forefront surface in the fifth lens group.

26. A zoom lens according to claim 25, wherein said third lens group comprises two positive lens elements, and wherein said fourth lens group consists of one single lens element.

27. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:

said zoom lens is a five-unit zoom lens; and zooming is carried out by varying all spacings between said lens groups, and said first lens group moves in such a way as to arrive at the object side of the zoom lens at a telephoto end position rather than at a wide-angle end position, which satisfies the following conditions (4) and (5):

$$0.3 < D45W/f_W < 0.8 \quad (4)$$

$$0.17 < D45T/f_T < 0.5 \quad (5)$$

where D45W is a spacing between the fourth lens group and the fifth lens group at the wide-angle end, D45T is a spacing between the fourth lens group and the fifth lens group at the telephoto end, $f_W$ is a focal length of the zoom lens at the wide-angle end, and $f_T$ is a focal length of the zoom lens at the telephoto end.

28. A zoom lens according to claim 27, wherein said third lens group comprises two positive lens elements, and wherein said fourth lens group consists of one single lens element.

29. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:

said zoom lens is a five-unit zoom lens comprising a stop that is movable together with the third lens group; and zooming is carried out by varying all spacings between said lens groups, and said first lens group moves in such a way as to arrive at the object side of the zoom lens at a telephoto end position rather than at a wide-angle end position, which satisfies the following condition (6):

$$9.0 < f_1/f_W < 20.0 \quad (6)$$

where $f_1$ is a focal length of the first lens group, and $f_W$ is a focal length of the zoom lens at the wide-angle end.

30. A zoom lens according to claim 29, wherein said third lens group comprises two positive lens elements, and wherein said fourth lens group consists of one single lens element.

31. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:

said zoom lens is a five-unit zoom lens; and zooming is carried out by varying all spacings between said lens groups, and said first lens group moves in such a way as to arrive at the object side of the zoom lens at a telephoto end position rather than at a wide-angle end position, which satisfies the following condition (7):

$$-1.7 < f_2/f_W < -1.4 \quad (7)$$

where $f_2$ is a focal length of the second lens group, and $f_W$ is a focal length of the zoom lens at the wide-angle end.

32. A zoom lens according to claim 31, wherein said third lens group comprises two positive lens elements, and wherein said fourth lens group consists of one single lens element.

33. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:

said zoom lens is a five-unit zoom lens; and zooming is carried out by varying all spacings between said lens groups, and said first lens group moves in such a way as to arrive at the object side of the zoom lens at a telephoto end position rather than at a wide-angle end position, wherein:

the second lens group consists of a first subunit and a second subunit wherein the first subunit comprises a negative meniscus lens element concave on an image plane side thereof, and the second subunit comprises a doublet component consisting of, in order from an object side thereof, a negative lens element and a positive lens element, said doublet having a cemented surface convex on an object side thereof.

34. A zoom lens according to claim 33, wherein said third lens group comprises two positive lens elements, and wherein said fourth lens group consists of one single lens element.

35. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:

said zoom lens is a five-unit zoom lens; and zooming is carried out by varying all spacings between said lens groups, and said first lens group moves in such a way as to arrive at the object side of the zoom lens at a telephoto end position rather than at a wide-angle end position, wherein:

one lens element forming the fourth lens group is a single lens element and satisfies the following condition (15):

$$0.5 < SF4g \quad (15)$$

where $SF4g=(Rf+Rb)/(Rf-Rb)$ wherein Rf is an axial radius of curvature of a front surface of the lens component forming the fourth lens group, and Rb is an axial radius of curvature of a rear surface of the lens component forming the fourth lens group.

36. A zoom lens according to claim 35, wherein said third lens group comprises two positive lens elements.

37. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:

said zoom lens is a five-unit zoom lens; and zooming is carried out by varying all spacings between said lens groups, and said first lens group moves in such a way as to arrive at the object side of the zoom lens at a telephoto end position rather than at a wide-angle end position, which satisfies the following condition (16);

$$0.4 < \Delta\beta 3/\Delta\beta 2 < 2.0 \quad (16)$$

where $\Delta\beta 2$ is a zoom ratio of the second lens group, and $\Delta\beta 3$ is a zoom ratio of the third lens group.

38. A zoom lens according to claim 37, wherein said third lens group comprises two positive lens elements, and wherein said fourth lens group consists of one single lens element.

39. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:

said zoom lens is a five-unit zoom lens; and zooming is carried out by varying all spacings between said lens groups, and said first lens group moves in such a way as to arrive at the object side of the zoom lens at a telephoto end position rather than at a wide-angle end position, which satisfies the following condition (17):

$$1.0 < LW/IH < 20.0 \quad (17)$$

where LW is a length of the zoom lens at the wide angle, and IH is a maximum image height.

40. A zoom lens according to claim 39, wherein said third lens group comprises two positive lens elements, and wherein said fourth lens group consists of one single lens element.

41. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:

said zoom lens is a five-unit zoom lens comprising a stop that is movable together with the third lens group; and zooming is carried out by varying all spacings between said lens groups, and said first lens group moves in such a way as to arrive at the object side of the zoom lens at a telephoto end position rather than at a wide-angle end position, which satisfies the following condition (18):

$$0.05 < d45W/f_5 < 0.25 \quad (18)$$

where d45W is a spacing between the fourth lens group and the fifth lens group at the wide-angle end, and $f_5$ is a focal length of the fifth lens group.

42. A zoom lens according to claim 41, wherein said third lens group comprises two positive lens elements, and wherein said fourth lens group consists of one single lens element.

43. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:

said zoom lens is a five-unit zoom lens; and zooming is carried out by varying all spacings between said lens groups, and said first lens group moves in such a way as to arrive at the object side of the zoom lens at a telephoto end position rather than at a wide-angle end position, wherein:

the first lens group consists of two lens elements or a negative lens element convex on an object side thereof and a positive lens element convex on an object side thereof.

44. A zoom lens according to claim 43, wherein said third lens group comprises two positive lens elements, and wherein said fourth lens group consists of one single lens element.

45. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:

said zoom lens is a five-unit zoom lens; and zooming is carried out by varying all spacings between said lens groups, and said first lens group moves in such a way as to arrive at the object side of the zoom lens at a telephoto end position rather than at a wide-angle end position, wherein:

the second lens group consists of, in order from an object side thereof, a negative lens element, a negative lens element, a negative lens element and a positive lens element or four lens elements in all, wherein:

the first and second lens elements in the second lens group, as viewed from an object side thereof, are each a negative meniscus lens element concave on an image plane side thereof.

46. A zoom lens according to claim 45, wherein said third lens group comprises two positive lens elements, and wherein said fourth lens group consists of one single lens element.

47. A zoom lens comprising, in order from an object side thereof, a first lens group having positive power, a second lens group having negative power, said second lens group moves during zooming, a third lens group having positive power, a fourth lens group having negative power and a fifth lens group having positive power, said fourth lens group consisting of one lens element, which satisfies the following condition (25):

$$1.4 < R1b/R2f < 3.0 \qquad (25)$$

where R1b is an axial radius of curvature of a final surface in the first lens group, and R2f is an axial radius of curvature of a forefront surface in the second lens group and wherein:
  said zoom lens is a five-unit zoom lens; and
    zooming is carried out by varying all spacings between said lens groups, and said first lens group moves in such a way as to arrive at the object side of the zoom lens at a telephoto end position rather than at a wide-angle end position.
48. A zoom lens according to claim 47,
  wherein said third lens group comprises two positive lens elements.
49. A zoom lens comprising, in order from an object side thereof, a first lens group having positive power, a second lens group having negative power, a third lens group having positive power, a fourth lens group having negative power and a fifth lens group having positive power, said fourth lens group consisting of one lens component, wherein:
  said zoom lens is a five-unit zoom lens comprising a stop that is movable together with the third lens group; and
  zooming is carried out by varying all spacings between said lens groups, and said first lens group moves in such a way as to arrive at the object side of the zoom lens at a telephoto end position rather than at a wide-angle end position, which satisfies the following condition (27):

$$30° < \omega_W < 47° \qquad (27)$$

where $\omega_W$ is a half angle of view at the wide-angle end,
  wherein said third lens group comprises two positive lens elements, and wherein said fourth lens group consists of one single lens element.

* * * * *

UNITED STATES PATENT AND TRADEMARK OFFICE
CERTIFICATE OF CORRECTION

| | |
|---|---|
| PATENT NO. | : 7,177,092 B2 |
| APPLICATION NO. | : 10/329965 |
| DATED | : February 13, 2007 |
| INVENTOR(S) | : Tomoyuki Satori et al. |

It is certified that error appears in the above-identified patent and that said Letters Patent is hereby corrected as shown below:

Column 22, line 29, change "thereof a first lens group" to --thereof, a first lens group--;

Column 23, line 30, change "$1.0 \leqq SF22$" to --$1.0 \leqq SF_{22}$--;

Column 23, line 49, change "$1.4<R1b/R2f3.0$" to --$1.4<R1b/R2f<3.0$-- and

Column 25, line 52, change "$0.17<D45T/f_T 0.5$" to --$0.17<D45T/f_T<0.5$--.

Signed and Sealed this

Fourteenth Day of August, 2007

JON W. DUDAS
*Director of the United States Patent and Trademark Office*